United States Patent
Sato

(10) Patent No.: US 7,366,209 B2
(45) Date of Patent: Apr. 29, 2008

(54) ORTHOGONAL POLARIZATION MULTIPLEXING TRANSMISSION APPARATUS AND MULTIPLEXING METHOD USED FOR THE SAME

(75) Inventor: Yoshiro Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 1029 days.

(21) Appl. No.: 10/342,182

(22) Filed: Jan. 15, 2003

(65) Prior Publication Data

US 2003/0137927 A1 Jul. 24, 2003

(30) Foreign Application Priority Data

Jan. 16, 2002 (JP) ............... 2002-006863

(51) Int. Cl.
*H04J 3/02* (2006.01)
(52) U.S. Cl. ............... 370/537; 370/203; 398/65; 398/81
(58) Field of Classification Search ............... None
See application file for complete search history.

(56) References Cited

U.S. PATENT DOCUMENTS

| | | | | |
|---|---|---|---|---|
| 5,818,813 | A * | 10/1998 | Saito et al. ............... | 370/208 |
| 6,137,604 | A * | 10/2000 | Bergano ............... | 398/1 |
| 6,236,480 | B1 * | 5/2001 | Atlas ............... | 398/9 |
| 6,342,965 | B1 * | 1/2002 | Kinoshita ............... | 359/334 |
| 6,377,372 | B1 * | 4/2002 | Yanagi ............... | 398/79 |
| 6,459,515 | B1 * | 10/2002 | Bergano ............... | 398/79 |
| 6,600,582 | B1 * | 7/2003 | Liu et al. ............... | 398/79 |
| 6,738,181 | B1 * | 5/2004 | Nakamoto et al. ............... | 359/337 |
| 6,748,134 | B2 * | 6/2004 | Bigo et al. ............... | 385/24 |

FOREIGN PATENT DOCUMENTS

| | | |
|---|---|---|
| JP | 09-046318 | 2/1997 |
| JP | 2001-44934 | 2/2001 |
| JP | 2001-94510 | 4/2001 |
| JP | 2001-094535 | 4/2001 |
| JP | 2001-94535 | 4/2001 |
| JP | 2001-103006 | 4/2001 |
| JP | 2001-203638 | 7/2001 |
| JP | 2001-333015 | 11/2001 |
| JP | 2003-8550 | 1/2003 |

* cited by examiner

*Primary Examiner*—Kwang Bin Yao
*Assistant Examiner*—Sameer Aghera
(74) *Attorney, Agent, or Firm*—Young & Thompson

(57) ABSTRACT

An orthogonal polarization multiplexing transmission apparatus capable of performing dispersion compensation considering a short wavelength side and a long wavelength side of a zero dispersion wavelength. A plurality of light signals of different wavelengths are divided into two orthogonal polarization multiplexing portions, and the light signals of an oddnumber array polarization multiplexing portion and an even-number array polarization multiplexing portion are orthogonal-polarization-multiplexed in each orthogonal polarization multiplexing portions. Adjacent light signals of the two orthogonal polarization multiplexing portions have their mutual planes of polarization rendered non-orthogonal when multiplexed by an optical multiplexer so that, for the purpose of deterring inter-symbol interference, a guard hand having the wavelength spacing rendered wider than that on orthogonal polarization multiplexing is provided in advance.

11 Claims, 18 Drawing Sheets

101,102,201,202 : MULTIPLEXING PORTION 101, 102, 201, 202 : MULTIPLEXING PORTION

PRIOR ART

PRIOR ART

PRIOR ART

① : VERTICAL POLARIZATION

⊖ : HORIZONTAL POLARIZATION

401 : ODD - NUMBER POLARIZATION MULTIPLEXING POTION

402 : EVEN - NUMBER POLARIZATION MULTIPLEXING POTION

PRIOR ART

ORTHOGONAL POLARIZATION MULTIPLEXING TRANSMISSION APPARATUS AND MULTIPLEXING METHOD USED FOR THE SAME

BACKGROUND OF THE INVENTION

1. Field of the Invention

The present invention relates to an orthogonal polarization multiplexing transmission apparatus and a multiplexing method used for the apparatus, and in particular, to the orthogonal polarization multiplexing transmission apparatus used for orthogonal polarization multiplexing and transmission dispersion compensation in DWDM (dense wavelength division multiplexing) and a multiplexing method used for the apparatus.

2. Description of the Related Art

FIG. 18 is a waveform chart of an example of wavelength division multiplexing (WDM). This diagram shows a condition in which light signals of channels 1 to 5 are multiplexed in increasing order of wavelength. Moreover, the vertical axis indicates transmission power Pw (W: watt), and the horizontal axis indicates a wavelength λ (nm). This is the same as to the drawings referred to hereafter. In the past, 64-wave WDM (0.4-nm spacing) was used as an example, and a wavelength spacing of each light signal is relatively wide as shown in this diagram.

On the other hand, in recent years, dense wavelength multiplexing (DWDM) such as 128-wave WDM (0.2-nm spacing) is considered because of requests to further increase transmission capacity. FIG. 19 is a waveform chart of an example of this dense wavelength division multiplexing. As shown in this chart, in the case of dense wavelength multiplexing, the wavelength spacing of each light signal is narrower than the waveform in FIG. 18. Therefore, crosstalk (interference) occurs between adjacent channels as shown in a crosstalk explanation diagram in FIG. 20, and it becomes a cause of signal deterioration.

Thus, orthogonal polarization multiplexing is used as one of the means for preventing this crosstalk. FIG. 21 is a waveform chart showing an example of the orthogonal polarization multiplexing. With reference to this chart, it is constituted so that odd-numbered array waves (1, 3, 5, 7, . . . ch) and even-numbered array waves (2, 4, 6, . . . ch) are mutually in the polarization directions of 90 degrees, that is, orthogonal. Thus, polarized waves of the adjacent channels are orthogonal, so that the crosstalk between the adjacent channels can be prevented.

On the other hand, the transmitted light signals of wavelength division multiplexing have wavelength dispersion occurring in an optical transmission line such as an optical fiber before they are received by a receiving apparatus. FIG. 22 is an explanatory diagram of the signal deterioration due to the wavelength dispersion. As shown in this diagram, a transmitting light signal T has the wavelength dispersion occurring in the optical transmission line, and consequently the waveform of a receiving light signal R in the receiving apparatus has its waveform collapsed compared to the transmitting light signal T. The longer the transmission line becomes, the more significant this waveform deterioration becomes due to influence of the wavelength dispersion. Binary determination of data becomes difficult in the receiving apparatus due to this waveform deterioration.

Thus, a dispersion-compensating fiber (DCF) is used in order to prevent the waveform deterioration caused by this wavelength dispersion. FIG. 23 is a block diagram of an example of the orthogonal polarization multiplexing transmission apparatus using the past dispersion-compensating fiber. With reference to this diagram, the example of the orthogonal polarization multiplexing transmission apparatus in the past is constituted by including an odd-number array polarization multiplexing portion 401, an even-number array polarization multiplexing portion 402, apolarization orthogonal multiplexer 17, an optical amplifier 18 and a dispersion-compensating fiber 19.

Next, operation of this orthogonal polarization multiplexing transmission apparatus will be described. An odd-numbered array multiple light signal outputted from the odd-number array polarization multiplexing portion 401 and an even-numbered array multiple light signal outputted from the even-number array polarization multiplexing portion 402 are multiplexed by the polarization orthogonal multiplexer 17 so that a polarization signal wherein an odd-numbered order and an even-numbered order are mutually orthogonal is generated. Next, an optical level lowered by insertion loss of the polarization orthogonal multiplexer 17 is amplified to a predetermined level by the optical amplifier 18, and the light signal after amplification has band dispersion compensation performed thereto by the dispersion-compensating fiber 19 and is outputted. Moreover, as shown in this diagram, an input route to the polarization orthogonal multiplexer 17 is a polarization preserving section, and an output route from the polarization orthogonal multiplexer 17 onward is a polarization non-preserving section.

Moreover, it is clear that, also in the orthogonal polarization multiplexing, the ideal is to individually perform dispersion compensation to each light signal, that is, to provide one dispersion-compensating fiber to each light signal input portion of the odd-number array polarization multiplexing portion 401 and the even-number array polarization multiplexing portion 402 for instance. To do so, however, it is considered that the dispersion-compensating fiber for preserving a plane of polarization is necessary. Nevertheless, such a dispersion-compensating fiber has not been developed to date, and so a configuration wherein the dispersion-compensating fiber 19 is placed on an output side of the polarization orthogonal multiplexer 17 as in FIG. 23 is generally used.

Next, the example of the orthogonal polarization multiplexing transmission apparatus using the past dispersion-compensating fiber will be described further in detail. FIG. 24 is a detailed explanatory diagram of the orthogonal polarization multiplexing transmission apparatus using the past dispersion-compensating fiber. Moreover, the same components as in FIG. 23 are given the same numbers and description thereof will be omitted.

With reference to FIG. 24, the example of the orthogonal polarization multiplexing transmission apparatus in the past is constituted by including an orthogonal polarization multiplexing portion 400, the optical amplifier 18, the dispersion-compensating fiber 19 and an optical amplifier 20.

In addition, the orthogonal polarization multiplexing portion 400 is comprised of the odd-number array polarization multiplexing portion 401, the even-number array polarization multiplexing portion 402 and the polarization orthogonal multiplexer 17. The odd-number array polarization multiplexing portion 401 and the even-number array polarization multiplexing portion 402 are comprised of a plurality of optical transmitters 15 and polarization preserving optical multiplexers 16 respectively.

The light signals of odd-numbered array wavelengths $\lambda 15\text{-}1$, $\lambda 15\text{-}3$ . . . , $\lambda 15\text{-}(2i-1)$ (i is a positive integer) outputted from the optical transmitters 15-1, 15-3 . . . , 15-$(2i-1)$ of the odd-number array polarization multiplexing portion 401 are outputted in a state of being preserved in a fixed polarization direction and are polarization-preservation-multiplexed by the polarization preserving optical multiplexer 16-1.

The light signals of even-numbered array wavelengths λ15-2, λ15-4 . . . , λ15-(2i) outputted from the optical transmitters 15-2, 15-4 . . . , 15-(2i) of the even-number array polarization multiplexing portion 402 are outputted in a state of being preserved to be orthogonal to the polarized waves of the light signals of odd-numbered array wavelengths and are polarization-preservation-multiplexed by the polarization preserving optical multiplexer 16-2.

The multiple light signals of the odd-number array polarization multiplexing portion 401 outputted from the polarization preserving optical multiplexer 16-1 and the multiple light signals of the even-number array polarization multiplexing portion 402 outputted from the polarization preserving optical multiplexer 16-2 are multiplexed by the polarization orthogonal multiplexer 17 with mutual polarized waves orthogonally preserved.

All the wavelength multiple light signals outputted from the polarization orthogonal multiplexer 17 have the optical level lowered by the insertion loss of the route of the input side amplified to a predetermined optical level and outputted by the optical amplifier 18. Thereafter, all the wavelength multiple light signals have band dispersion compensation of F [ps] performed thereto by the dispersion-compensating fiber 19, and the optical level lowered by the insertion loss of the dispersion-compensating fiber 19 is amplified to the predetermined optical level by the optical amplifier 20 and thereafter, it is outputted to the transmission line.

On the other hand, Japanese Patent Laid-Open No. 2001-203638 (hereafter, referred to as a document 1) discloses a configuration wherein polarization multiplexing light is rendered as one block, and each light signal is placed so that the wavelength spacing between the blocks becomes larger than the wavelength spacing of the light signals in each block, Japanese Patent Laid-Open No. 2001-094535 (hereafter, referred to as a document 2) discloses a configuration wherein the dispersion-compensating fiber is provided to a set of orthogonal polarization multiplexing signals, and Japanese Patent Laid-Open No. 2001-103006 (hereafter, referred to as a document 3) discloses a configuration wherein wavelength dispersion compensation is performed to each piece of wavelength light and then polarization orthogonal multiplexing is performed. In addition, a technology related to the document 3 is disclosed in Japanese Patent Laid-Open No. 9-046318 (hereafter, referred to as a document 4).

Although the technology disclosed in the document 1 provides a guard band between the blocks, it is a different invention from the present invention because it has no description of the dispersion compensation. The technology disclosed in the document 2 is in common with the aforementioned technology described in FIGS. 23 and 24 for providing the dispersion-compensating fiber to a set of orthogonal polarization multiplexing signals.

The technology disclosed in the document 3 performs wavelength dispersion compensation to each piece of wavelength light and then polarization orthogonal multiplexing is performed. Although it was mentioned earlier that "the ideal is to provide a dispersion-compensating fiber to each light signal input portion . . . . Nevertheless, such a dispersion-compensating fiber has not been developed to date," the technology disclosed in the document 3 is supposedly an exception thereto. However, the configuration of the dispersion-compensating fiber 16-1 disclosed in the document 3 (refer to FIG. 1 of the document 3) is complicated and particular, and so it is totally different from the present invention in that it cannot divert the dispersion-compensating fiber which has been existing. The document 4 is based on the document 3.

However, there is the following problem as to the orthogonal polarization multiplexing transmission apparatus of DWDM in the past shown in FIGS. 23 and 24. To be more specific, the transmission line has dispersion inclination against the wavelength, and so a difference in cumulative dispersion between the shortest wavelength and the longest wavelength becomes larger according to a transmission distance, and a dispersion compensation limit thereof becomes a major factor of a transmission distance limit. In the case of the aforementioned method in the past, in general, a cumulative dispersion error in a zero dispersion wavelength of the transmission line is selected as a dispersion compensation value to perform collective dispersion compensation to all the wavelengths, and thus it is not possible to perform the dispersion compensation considering the short wavelength side and the long wavelength side of the zero dispersion wavelength, and consequently, only a minimum transmission distance can be secured. The above documents 1 to 4 do not disclose the means for solving this problem, either.

SUMMARY OF THE INVENTION

Thus, an object of the present invention is to provide an orthogonal polarization multiplexing transmission apparatus capable of performing dispersion compensation considering a short wavelength side and a long wavelength side of a zero dispersion wavelength and a multiplexing method used for the apparatus.

In order to solve the above described problem, the orthogonal polarization multiplexing transmission apparatus according to the present invention is the apparatus in wavelength multiplexing characterized by including a plurality of orthogonal polarization multiplexing means for orthogonal-polarization-multiplexing odd-numbered array waves and even-numbered array waves in each of wavelength bands divided into a plurality, a plurality of dispersion compensating means for dispersion-compensating a signal orthogonal-polarization-multiplexed by each orthogonal polarization multiplexing means, and multiplexing means for multiplexing each signal dispersion-compensated by each dispersion compensating means, and wherein a band rendered wider than a wavelength spacing on orthogonal polarization multiplexing is provided between the above described wavelength bands divided into a plurality.

In addition, the multiplexing method according to the present invention is the method used for the orthogonal polarization multiplexing transmission apparatus in wavelength multiplexing, characterized by including a plurality of orthogonal polarization multiplexing steps of orthogonal-polarization-multiplexing odd-numbered array waves and even-numbered array waves in each of the wavelength bands divided into a plurality, a plurality of dispersion compensating steps of dispersion-compensating the signal orthogonal-polarization-multiplexed in each orthogonal polarization multiplexing step, and a multiplexing step of multiplexing each signal dispersion-compensated in each dispersion compensating step, and further including a step of providing the band rendered wider than the wavelength spacing on orthogonal polarization multiplexing between the above described wavelength bands divided into a plurality.

According to the present invention, it is possible to perform the dispersion compensation considering the short wavelength side and the long wavelength side of the zero dispersion wavelength.

The present invention provides a technology for dividing the wavelength band into a plurality and performing transmission dispersion compensation to each of the wavelength bands. In FIG. 1, a plurality of light signals of different wavelengths are divided into an orthogonal polarization multiplexing portion 100 and an orthogonal polarization multiplexing portion 200, and the light signals of an odd-number array polarization multiplexing portion and an even-number array polarization multiplexing portion are orthogonal-polarization-multiplexed by the polarization orthogonal multiplexer in the respective orthogonal polarization multiplexing portion 100 and orthogonal polarization multiplexing portion 200. Here, when multiplexed by an optical multiplexer 9, the adjacent light signals of the orthogonal polarization multiplexing portion 100 and the orthogonal polarization multiplexing portion 200 have their mutual planes of polarization rendered non-orthogonal so that, for the sake of deterring inter-symbol interference, a guard band having the wavelength spacing rendered wider than that on orthogonal polarization multiplexing is provided. To be more specific, as previously mentioned, it is because polarization is preserved on an input-side route of polarization orthogonal multiplexers 41 and 42, but the polarization is not preserved on an output-side route thereof.

Furthermore, a multiple light signal of the orthogonal polarization multiplexing portion 100 has band dispersion compensation performed thereto by a dispersion-compensating fiber 6-1, and likewise, a multiple light signal of the orthogonal polarization multiplexing portion 200 has the band dispersion compensation performed thereto by another dispersion-compensating fiber 6-2. And after being multiplexed by the optical multiplexer 9, each multiple light signal is collectively dispersion-compensated to all the wavelength multiple light signals by a dispersion-compensating fiber 10 and is outputted to the transmission line.

Thus, according to the present invention, it is possible to constitute the orthogonal polarization multiplexing portion for each of the wavelength bands divided into a plurality and provide the guard band for the sake of deterring the inter-symbol interference between the wavelength bands so as to conduct transmission dispersion compensation management as to each of the wavelength bands.

DETAILED DESCRIPTION OF THE PREFERRED EMBODIMENTS

Figure 1:
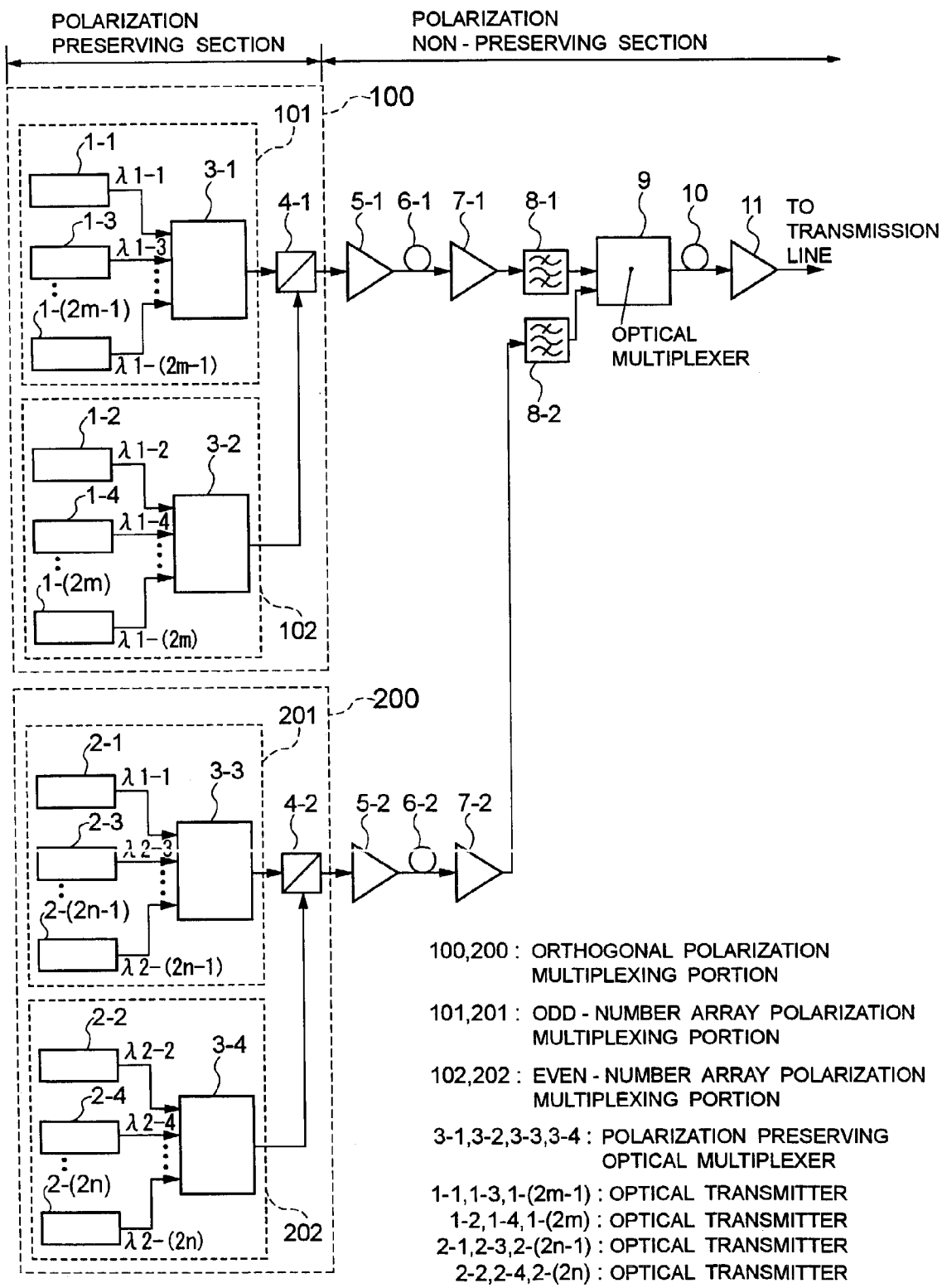
FIG. 1 is a block diagram of a first embodiment of an orthogonal polarization multiplexing transmission apparatus related to the present invention.
Figure 23:
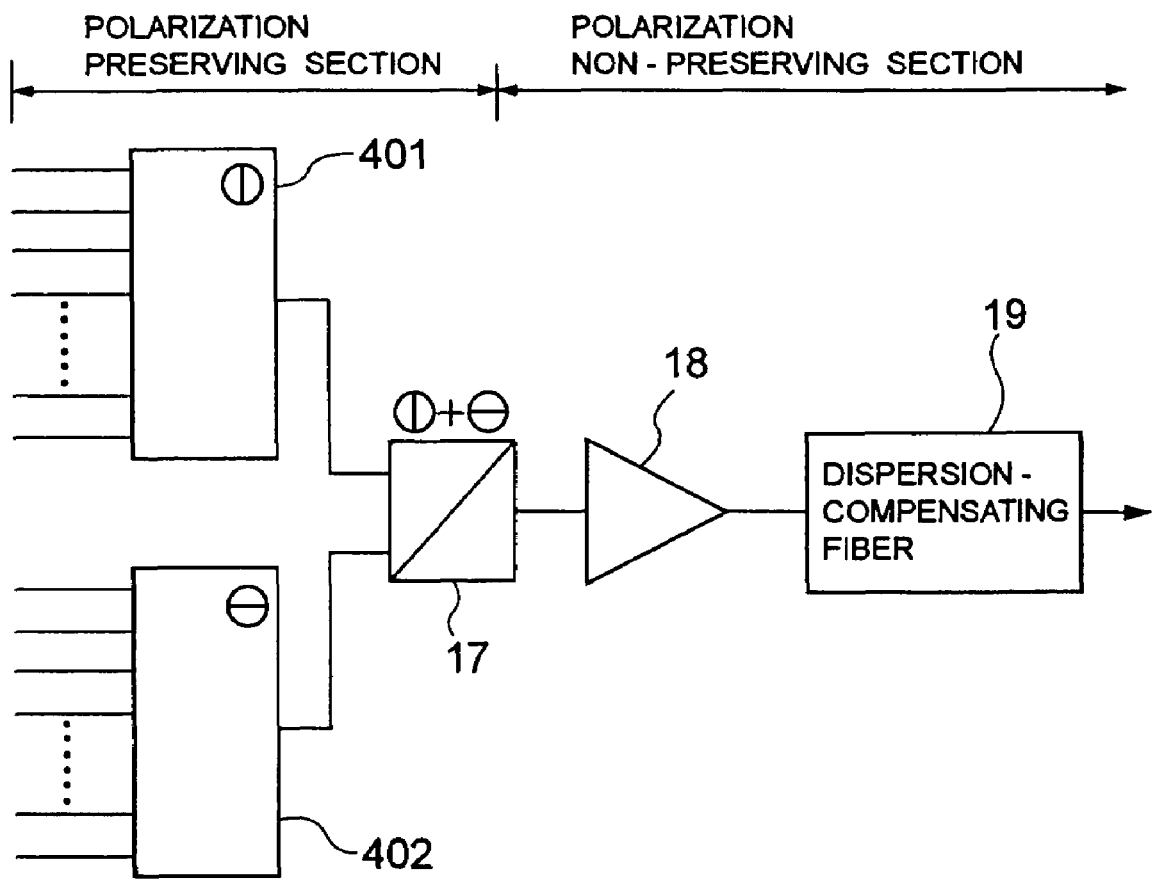
FIG. 23 is a block diagram of an example of the orthogonal polarization multiplexing transmission apparatus using the past dispersion-compensating fiber.
Figure 24:
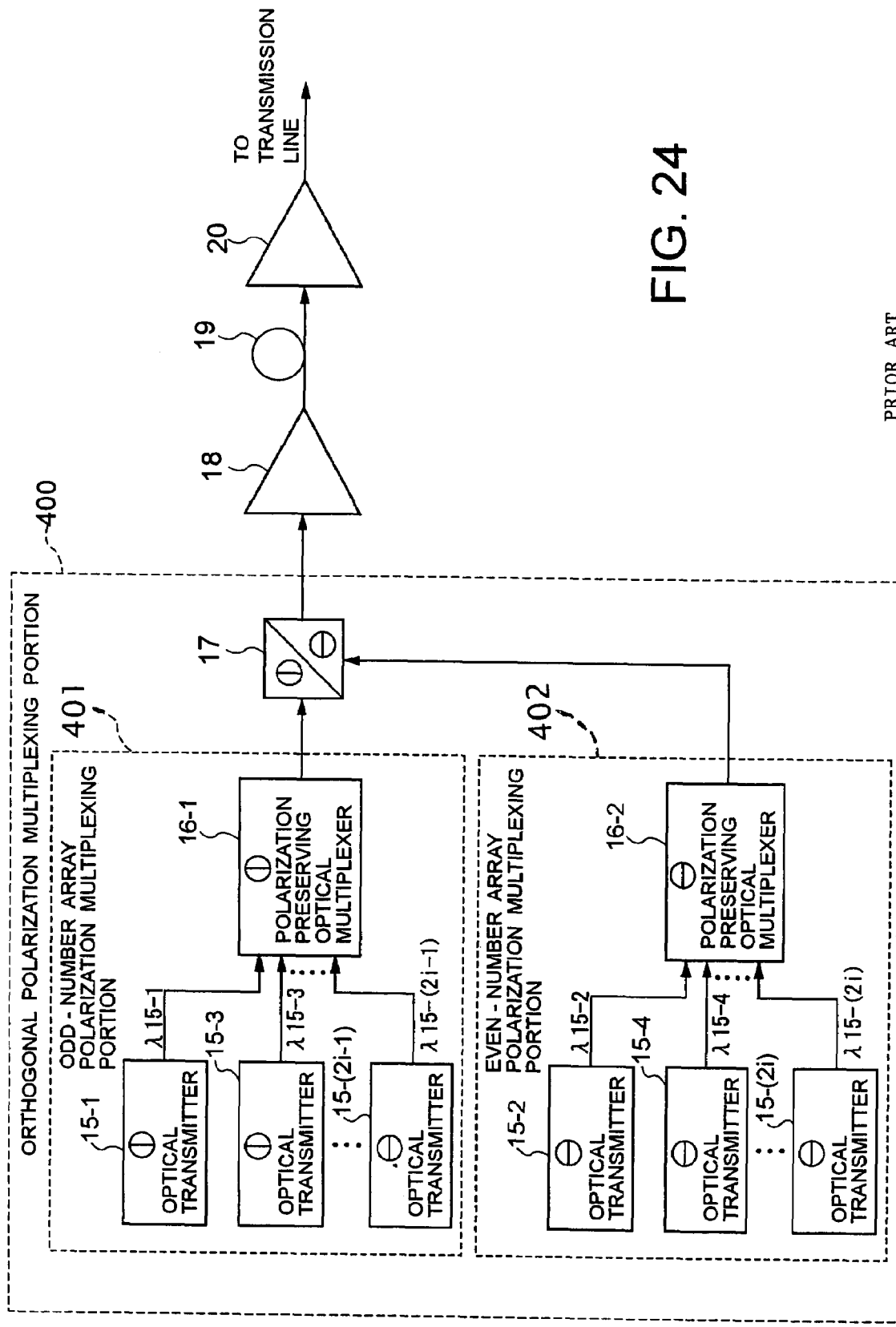
FIG. 24 is a detailed explanatory diagram of the orthogonal polarization multiplexing transmission apparatus using the past dispersion-compensating fiber.

Hereafter, embodiments of the present invention will be described by referring to the attached drawings. First, a first embodiment will be described. FIG. 1 is a block diagram of the first embodiment of an orthogonal polarization multiplexing transmission apparatus related to the present invention. Moreover, the same components as in FIGS. 23 and 24 are given the same numbers and description thereof will be omitted.

With reference to FIG. 1, an orthogonal polarization multiplexing portion 100 is comprised of an odd-number array polarization multiplexing portion 101, an even-number array polarization multiplexing portion 102 and a polarization orthogonal multiplexer 4-1, and an orthogonal polarization multiplexing portion 200 is comprised of an odd-number array polarization multiplexing portion 201, an even-number array polarization multiplexing portion 202 and a polarization orthogonal multiplexer 4-2. A wavelength band of the orthogonal polarization multiplexing portion 100 is located closer to a short wave side than that of the orthogonal polarization multiplexing portion 200. The odd-number array polarization multiplexing portion and the even-number array polarization multiplexing portion are comprised of a plurality of optical transmitters and polarization preserving optical multiplexers respectively.

Optical transmitters 1-1, 1-3, . . . , 1-(2m−1) (m is a positive integer) of the odd-number array polarization multiplexing portion 101 output light signals of different odd-numbered array wavelengths λ1-1, 1-3 . . . , 1-(2m−1) in a state of being preserved in a fixed polarization direction. Optical transmitters 1-2, 1-4, . . . , 1-(2m) of the even-number array polarization multiplexing portion 102 output light signals of even-numbered array wavelengths λ1-2, 1-4 . . . , 1-(2m) arranged alternately with the odd-numbered array wavelengths in a state of being preserved to be orthogonal to the polarized waves of the odd-numbered array wavelengths. In addition, optical transmitters 2-1, 2-3, . . . , 2-(2n−1) (n is a positive integer) of the odd-number array polarization multiplexing portion 201 output light signals of different odd-numbered array wavelengths λ2-1, 2-3 . . . , 2-(2n–1) in a state of being preserved in a fixed polarization direction.

Optical transmitters 2-2, 2-4, . . . , 2-(2n) of the even-number array polarization multiplexing portion 202 output the light signals of even-numbered array wavelengths λ2-2, 2-4 . . . , 2-(2n) arranged alternately with the odd-numbered array wavelengths in a state of being preserved to be orthogonal to the polarized waves of the odd-numbered array wavelengths. Polarization preserving optical multiplexers 3-1 to 3-4 perform polarization preserving multiplexing to output from a plurality of optical transmitters. Polarization orthogonal multiplexers 4-1 and 4-2 orthogonal-polarization-multiplex a multiple light signal of the odd-number array polarization multiplexing portion and that of the even-number array polarization multiplexing portion of which polarized waves are mutually orthogonal.

Optical amplifiers 5-1, 5-2, 7-1, 7-2 and 11 amplify a lowered optical level of the multiple light signal to a predetermined level and output it. The optical amplifiers used here should preferably have AGC (automatic gain control) which does not change another individual light signal power in the cases of increasing the wavelengths and a failure.

A dispersion-compensating fiber 6-1 performs band dispersion compensation of A [ps] to the multiple light signals of the orthogonal polarization multiplexing portion 100, and a dispersion-compensating fiber 6-2 performs band dispersion compensation of B [ps] to the multiple light signals of the orthogonal polarization multiplexing portion 200. In addition, a dispersion-compensating fiber 10 performs collective dispersion compensation of C [ps] to all the wavelength multiple light signals.

A band pass filter 8-1 passes only the wavelength band of the orthogonal polarization multiplexing portion 100, and eliminates ASE (Amplified Spontaneous Emission) radiated from the optical amplifiers mentioned earlier as to the outside of the band. In addition, a band pass filter 8-2 passes only the wavelength band of the orthogonal polarization multiplexing portion 200, and eliminates the ASE radiated from the optical amplifiers mentioned earlier as to the outside of the band. An optical multiplexer 9 multiplexes the multiple light signals from the band pass filters 8-1 and 8-2.

While the configuration of the first embodiment was described above, details of the internal configurations of the optical transmitters and optical amplifiers in FIG. 1 are omitted since they are well known to the traders and are not directly related to the present invention.

Next, operation of the orthogonal polarization multiplexing transmission apparatus in FIG. 1 will be described. The light signals of the odd-numbered array wavelengths λ1-1, λ1-3 . . . , λ1-(2m–1) outputted from the optical transmitters 1-1, 1-3, . . . , 1-(2m–1) (m is a positive integer) of the odd-number array polarization multiplexing portion 101 are outputted in the state of being preserved in a fixed polarization direction, and have polarization preserving multiplexing performed thereto by the polarization preserving optical multiplexer 3-1.

The light signals of the even-numbered array wavelengths λ1-2, λ1-4 . . . , λ1-(2m) outputted from the optical transmitters 1-2, 1-4, . . . , 1-(2m) of the even-number array polarization multiplexing portion 102 are outputted in the state of being preserved to be orthogonal to the polarized waves of the light signals of the odd-numbered array wavelengths, and have polarization preserving performed thereto by the polarization preserving optical multiplexer 3-2.

The multiple light signals of the odd-number array polarization multiplexing portion 101 outputted from the polarization preserving optical multiplexer 3-1 and the multiple light signals of the even-number array polarization multiplexing portion 102 outputted from the polarization preserving optical multiplexer 3-2 are multiplexed with mutual polarized waves orthogonally preserved by the polarization orthogonal multiplexer 4-1 so that the inter-symbol interference between the adjacent wavelengths of odd and even numbers becomes minimum and waveform deterioration is thereby suppressed.

The multiple light signals of the orthogonal polarization multiplexing portion 100 outputted from the polarization orthogonal multiplexer 4-1 have the optical level lowered by the insertion loss of the route mentioned earlier amplified to a predetermined optical level and outputted by the optical amplifier 5-1. Thereafter, the multiple light signals of the orthogonal polarization multiplexing portion 100 have band dispersion compensation of A [ps] performed thereto by the dispersion-compensating fiber 6-1, and the optical level lowered by the insertion loss of the dispersion-compensating fiber 6-1 is amplified to the predetermined optical level and outputted by the optical amplifier 7-1.

Likewise, the light signals of the odd-numbered array wavelengths λ2-1, λ2-3 . . . , λ2-(2n–1) (n is a positive integer) outputted from the optical transmitters 2-1, 2-3, . . . , 2-(2n–1) of the odd-number array polarization multiplexing portion 201 are outputted in a state of being preserved in a fixed polarization direction, and have polarization preserving multiplexing performed thereto by the polarization preserving optical multiplexer 3-3.

The light signals of the even-numbered array wavelengths λ2-2, λ2-4 . . . , λ2-(2n) outputted from the transmitters 2-2, 2-4, . . . , 2-(2n) of the even-number array polarization multiplexing portion 202 are outputted in a state of being preserved to be orthogonal to the polarized waves of the light signals of the odd-numbered array wavelengths, and have polarization preserving multiplexing performed thereto by the polarization preserving optical multiplexer 3-4.

The multiple light signals of the odd-number array polarization multiplexing portion 201 outputted from the polarization preserving optical multiplexer 3-3 and the multiple light signals of the even-number array polarization multiplexing portion 202 outputted from the polarization preserving optical multiplexer 3-4 are multiplexed with mutual polarized waves orthogonally preserved by the polarization orthogonal multiplexer 4-2 so that the inter-symbol interference between the adjacent wavelengths of odd and even numbers becomes minimum and the waveform deterioration is thereby suppressed.

The multiple light signals of the orthogonal polarization multiplexing portion 200 outputted from the polarization orthogonal multiplexer 4-2 have the optical level lowered by the insertion loss of the route mentioned earlier amplified to a predetermined optical level and outputted by the optical amplifier 5-2. Thereafter, the multiple light signals of the orthogonal polarization multiplexing portion 200 have the dispersion compensation of B [ps] performed thereto by the dispersion-compensating fiber 6-2, and the optical level lowered by the insertion loss of the dispersion-compensating fiber 6-2 is amplified to the predetermined optical level and outputted by the optical amplifier 7-2.

Next, the multiple light signals outputted from the optical amplifier 7-1 and the multiple light signals outputted from the optical amplifier 7-2 have their respective out-band ASE eliminated by the band pass filter 8-1 for passing only the short wavelength band and the band pass filter 8-2 for passing only the long wavelength band in order to avoid occurrence of SNR (Signal to Noise Ratio) deterioration by superimposing the ASE radiated from one of the optical amplifiers on the wavelength band of the other, and are multiplexed thereafter by the optical multiplexer 9.

Figure 2:
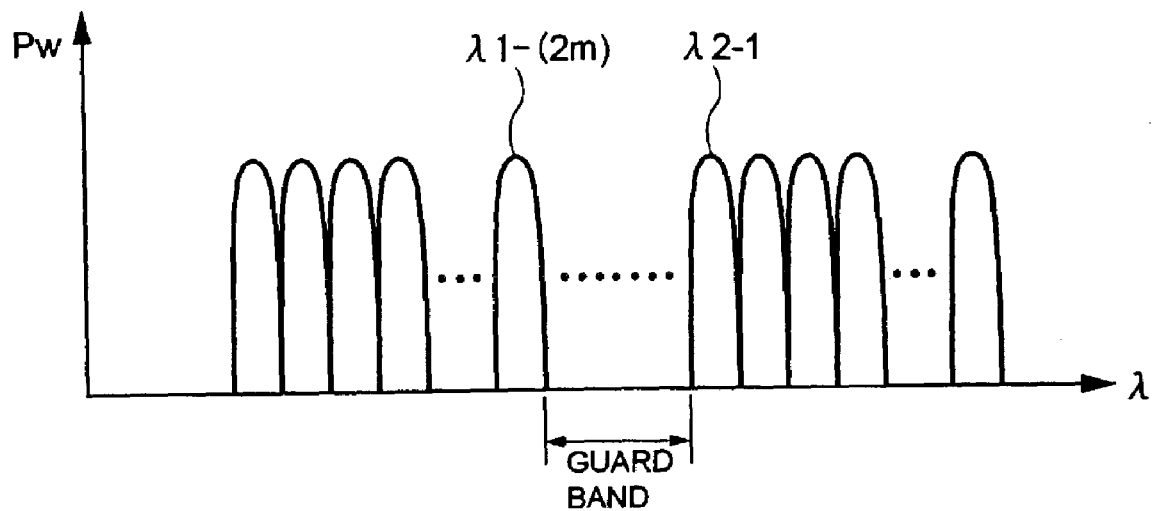
FIG. 2 is a diagram in which a guard band is provided between wavelength bands.
Figure 3:
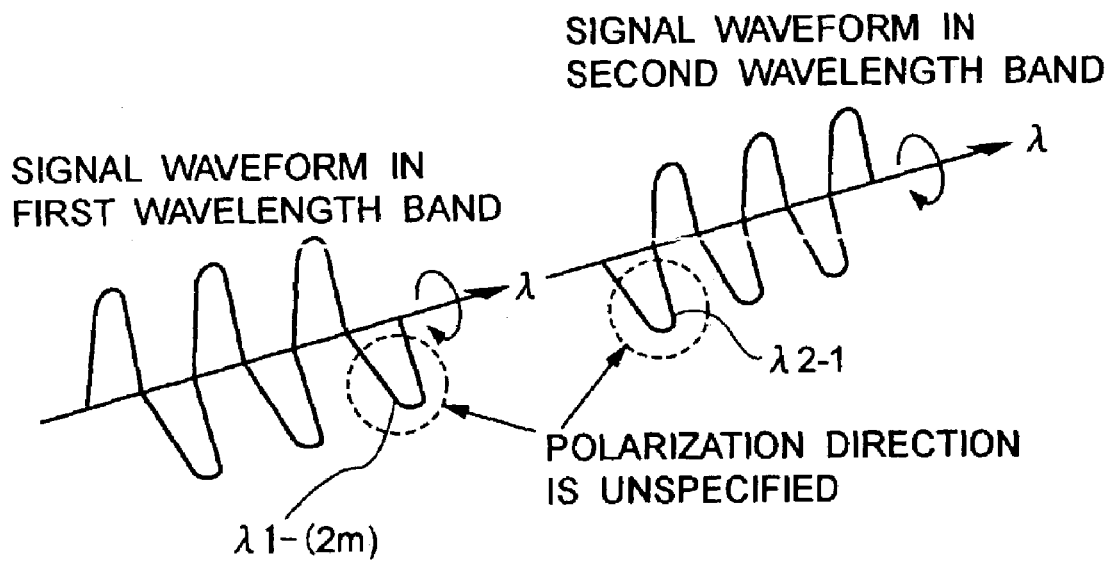
FIG. 3 is a diagram for explaining the reason for providing the guard band.

At this time, adjacent wavelengths $\lambda 1\text{-}(2m)$ and $\lambda 2\text{-}1$ are indeterminate as to a polarization direction and are non-orthogonal, and so signal waveform deterioration due to the inter-symbol interference occurs if multiplexed as-is with this wavelength spacing remaining narrow. As counter measures against it, from an initial wavelength disposition, a guard band having the wavelength spacing rendered wider than that on orthogonal polarization multiplexing is provided between the wavelength bands so as to deter the inter-symbol interference. FIG. 2 shows a diagram having the guard band provided between the wavelength bands, and FIG. 3 shows a diagram for explaining the reason for providing the guard band.

Thereafter, all the wavelength multiple light signals outputted from the optical multiplexer 9 have collective dispersion compensation of C [ps] performed thereto by the dispersion-compensating fiber 10, and have the optical level lowered by the insertion loss of the route mentioned earlier amplified to the predetermined optical level and outputted by the optical amplifier 11 so as to be outputted to the transmission line.

Thus, it is the dispersion compensation of A+C [ps] to the short wavelength band of the orthogonal polarization multiplexing portion 100, and it is the dispersion compensation of B+C [ps] to the long wavelength band of the orthogonal polarization multiplexing portion 200, so that transmission dispersion compensation management can be conducted as to each of the wavelength bands.

Figure 12:
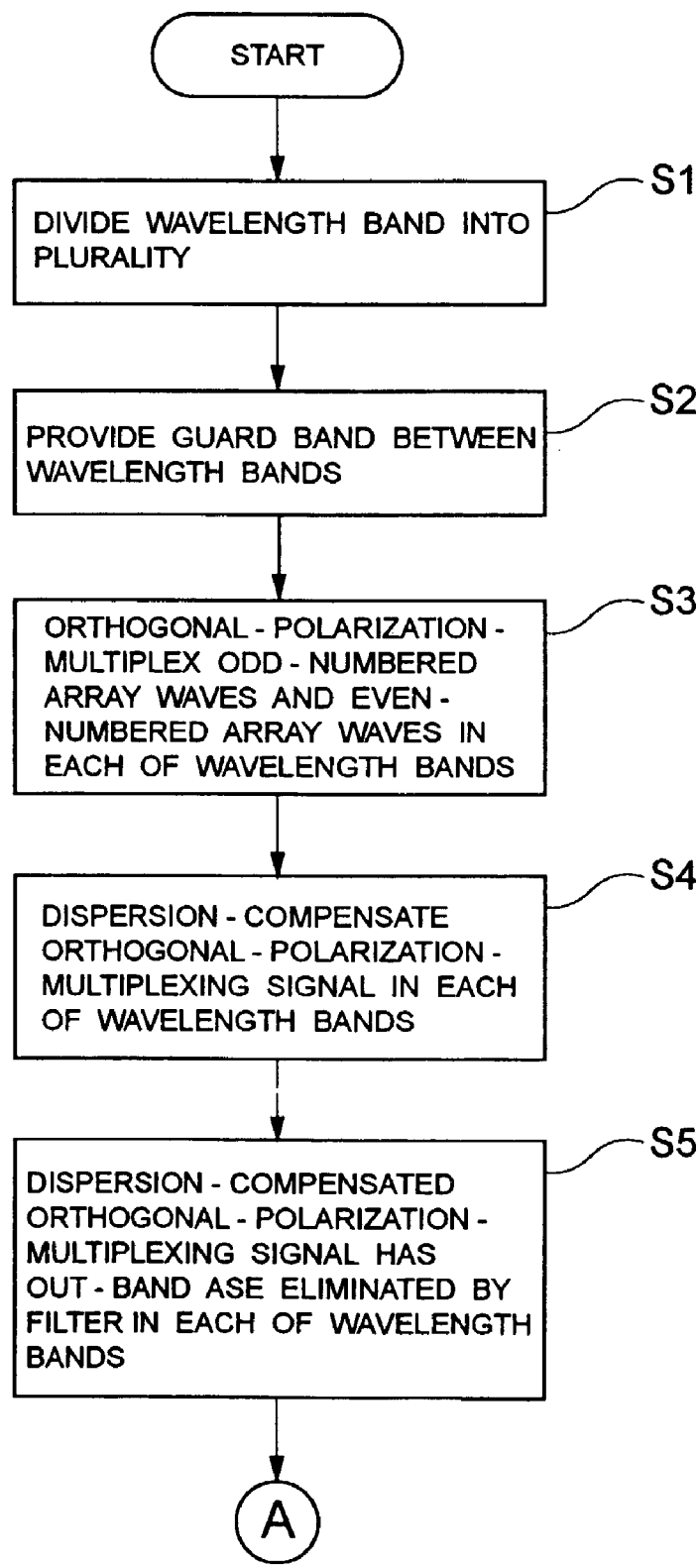
FIG. 12 is a flowchart showing a multiplexing method according to a second embodiment.
Figure 13:
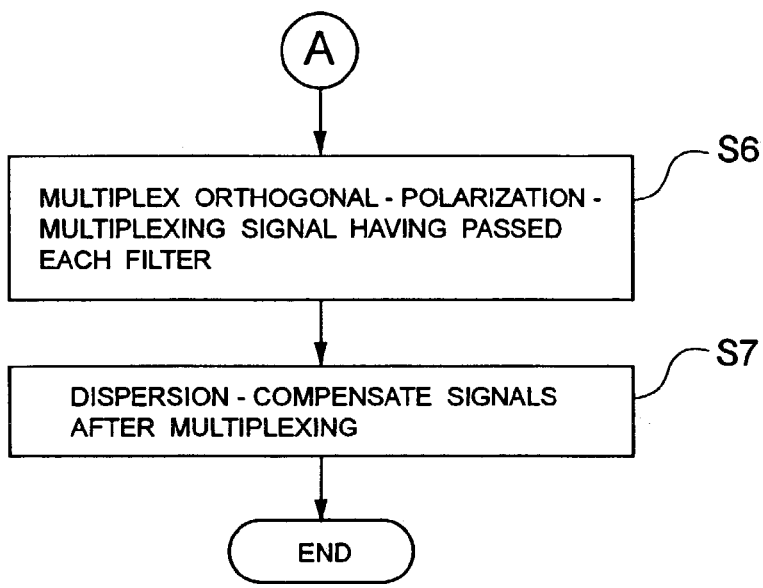
FIG. 13 is a flowchart showing the multiplexing method according to the second embodiment.

Next, a second embodiment of the present invention will be described. The second embodiment relates to a multiplexing method used for the orthogonal polarization multiplexing transmission apparatus of the first embodiment. FIGS. 12 and 13 are flowcharts showing the multiplexing method of the second embodiment.

With reference to these charts, the wavelength band is divided into a plurality (two in the first embodiment) (S1). and the guard band is provided between the wavelength bands (S2). Furthermore, the odd-numbered array waves and the even-numbered array waves are orthogonal-polarization-multiplexed in each of wavelength bands (S3), and the orthogonal polarization multiplexing signal is dispersion-compensated in each of wavelength bands (S4). Next, the dispersion-compensated orthogonal polarization multiplexing signal has the out-band ASE eliminated by the band pass filter in each of wavelength bands (S5). Next, the orthogonal polarization multiplexing signal having passed each band pass filter is multiplexed (S6), and furthermore, all the wavelength multiple light signals after multiplexing are dispersion-compensated (S7). Moreover, while the above description omitted insertion of the steps of optical amplification for compensating for the optical level lowered by the insertion loss of the route mentioned earlier between S3 and S4, S4 and S5, and subsequent to S7, it is possible, as a matter of course, to insert these steps.

Next, a third embodiment of the present invention will be described. While the basic configuration thereof is the same as the first embodiment, it is possible to further segmentalize the transmission dispersion compensation management of each of the wavelength bands by dividing the wavelength bands into k (k is a positive integer of 3 or more).

Figure 4:
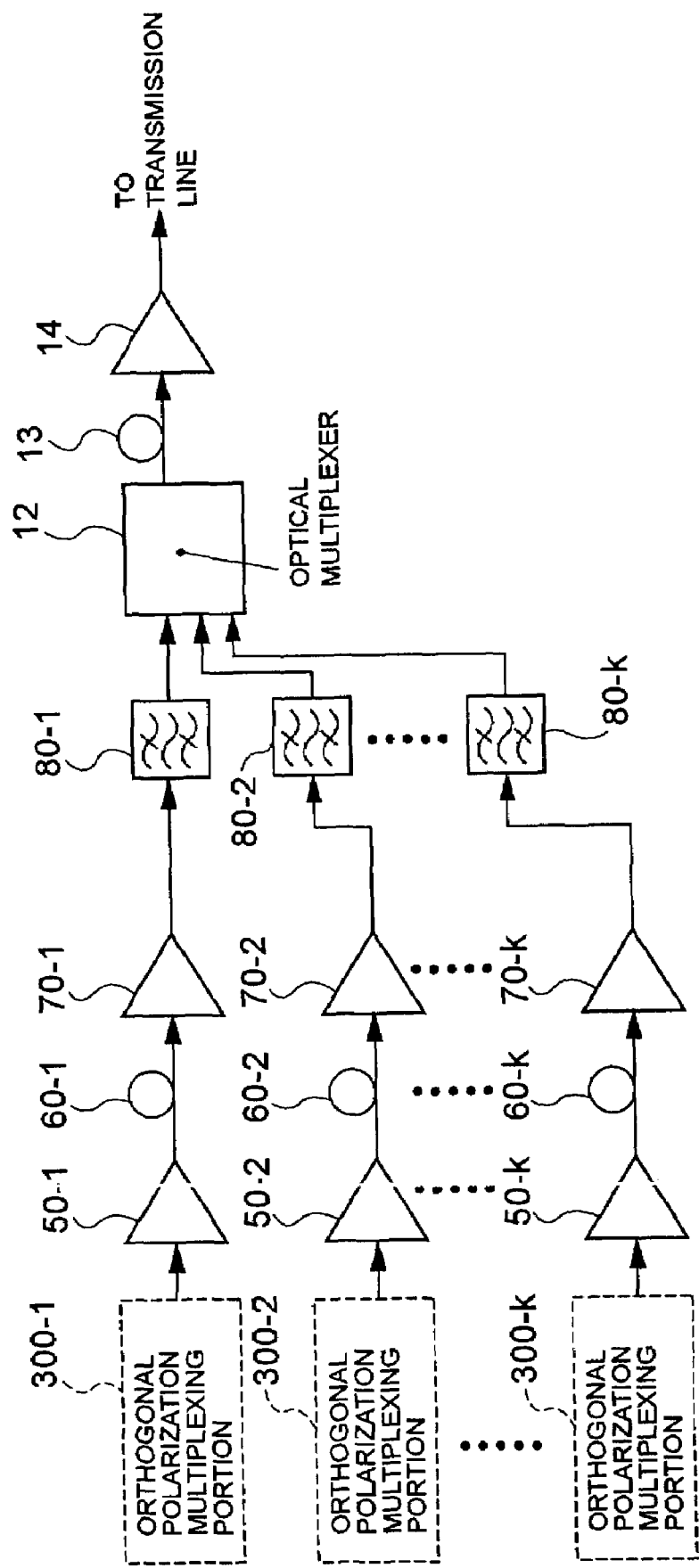
FIG. 4 is a block diagram of a third embodiment.

FIG. 4 is a block diagram of the third embodiment. With reference to this diagram, the orthogonal-polarization-multiplexed multiple light signal of each of the wavelength bands divided into k is outputted from orthogonal polarization multiplexing Portions 300-1 to 300-k. Here, the more the sub-number is, the closer to the long wavelength side the wavelength band of the orthogonal polarization multiplexing portion is.

Optical amplifiers 50-1 to 50-k, 70-1 to 70-k and 14 amplify the lowered optical level of the multiple light signal to the predetermined level and output it. The optical amplifiers used here should preferably have AGC which does not change another individual light signal power in the cases of increasing the wavelengths and a failure. Dispersion-compensating fibers 60-1 to 60-k perform the dispersion compensation of D1 [ps] to Dk [ps] to the multiple light signals of the wavelength bands divided into k respectively. In addition, a dispersion-compensating fiber 13 performs collective dispersion compensation of E [ps] to all the wavelength multiple light signals. The band pass filters 80-1 to 80-k pass only the respective wavelength bands, and cut the ASE radiated from the optical amplifiers mentioned earlier as to the outside of the bands. An optical multiplexer 12 multiplexes the multiple light signals from the band pass filters 80-1 and 80-k.

Next, the operation in FIG. 4 will be described. The multiple light signals from the orthogonal polarization multiplexing portion 300-1 have the optical level lowered by the insertion loss of the route mentioned earlier amplified to the predetermined optical level and outputted by the optical amplifier 50-1. Thereafter, the multiple light signals of this wavelength band have the dispersion compensation of D1 [ps] performed thereto by the dispersion-compensating fiber 60-1, and the optical level lowered by the insertion loss of the dispersion-compensating fiber 60-1 is amplified to the predetermined optical level and outputted by the optical amplifier 70-1.

The multiple light signals of the other orthogonal polarization multiplexing portions 300-2 to 300-k also undergo the same process as above, and the multiple light signals of each wavelength band have the dispersion compensation of D2 [ps] to Dk [ps] performed thereto.

Next, each multiple light signal outputted from the optical amplifiers 70-1 to 70-k has the out-band ASE eliminated by the band pass filters 80-1 to 80-k for passing only the respective wavelength bands in order to avoid occurrence of SNR deterioration by superimposing the ASE radiated from one of the optical amplifiers on the wavelength band of the other, and is multiplexed thereafter by the optical multiplexer 12. At this time, as adjacent wavelengths between the wavelength bands are indeterminate as to the polarization direction and are non-orthogonal, the signal waveform deterioration due to the inter-symbol interference occurs if multiplexed as-is with this wavelength spacing remaining narrow, and so the guard band rendered wider than the wavelength spacing on the orthogonal polarization multiplexing is provided so as to deter the inter-symbol interference.

Thereafter, all the wavelength multiple light signals outputted from the optical multiplexer 12 have the collective dispersion compensation of E [ps] performed thereto by the dispersion-compensating fiber 13, and have the optical level lowered by the insertion loss of the route mentioned earlier amplified to the predetermined optical level and outputted by the optical amplifier 14 so as to be outputted to the transmission line.

Thus, it is the dispersion compensation of D1+E [ps] to Dk+E [ps] to the wavelength bands of the orthogonal polarization multiplexing portions 300-1 to 300-k respectively so that the dispersion compensation management can be conducted per k pieces of wavelength band respectively.

As described above, according to the third embodiment, it is possible to further segmentalize and optimize the transmission dispersion compensation management of each of the wavelength bands and further extend the transmission distance by increasing the number of divisions of the wavelength band to 3 or more and thereby decreasing the number of wavelengths per wavelength band.

Figure 5:
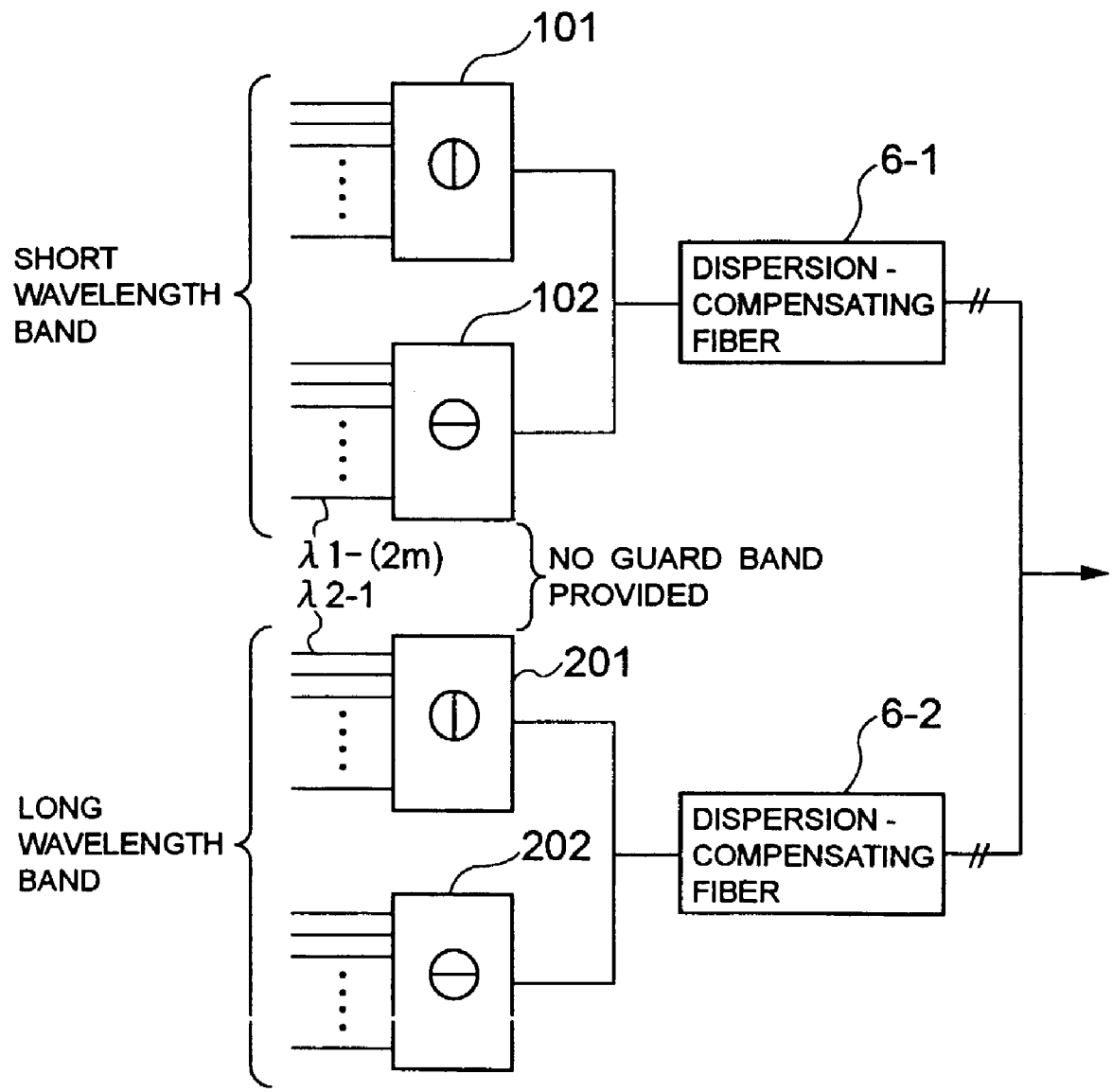
FIG. 5 is a block diagram of a first example.

Next, examples of the present invention will be described. First, a first example will be described. FIG. 5 is a block diagram of the first example. Moreover, while only the odd-number array polarization multiplexing portions 101, 201, the even-number array polarization multiplexing portions 102, 202 and the dispersion-compensating fibers 6-1, 6-2 are shown for the sake of convenience in this diagram, the basic configuration is the same as that of the first embodiment (refer to FIG. 1).

Figure 6:
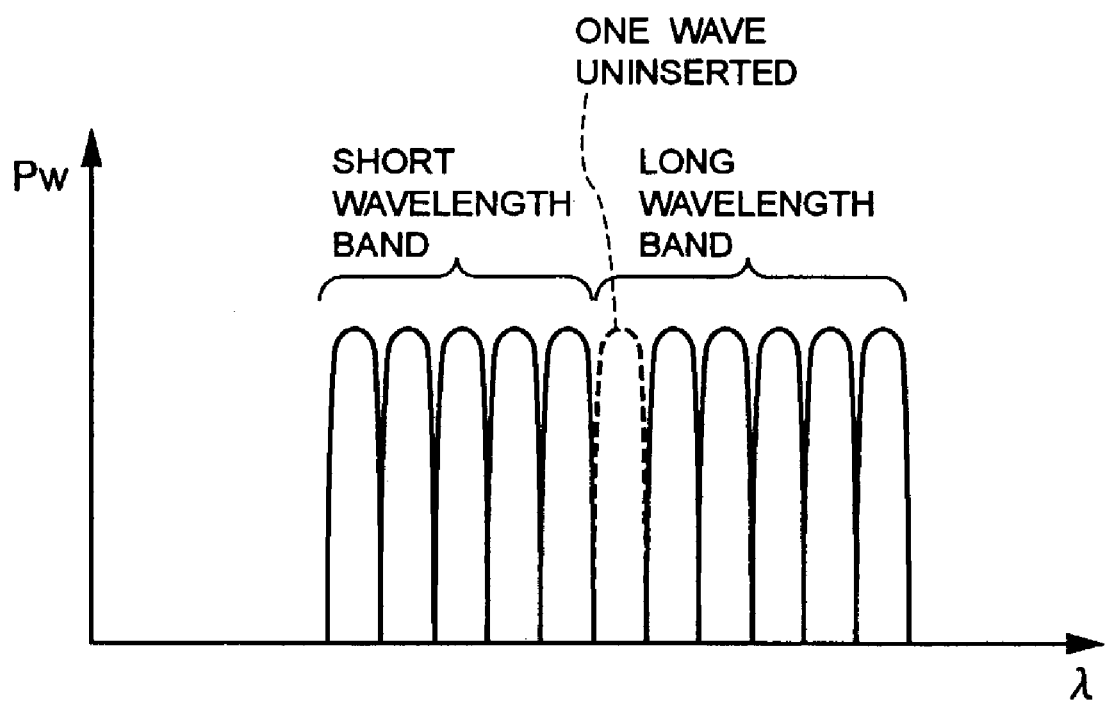
FIG. 6 is a waveform chart of the first example.

With reference to FIG. 5, the guard band shown in the first embodiment is not provided in the first example. Instead, in the case of dividing it into two, that is, the short wavelength band and the long wavelength band, the shortest wavelength $\lambda2$-1 of the long wavelength band is rendered uninserted in advance. It thus has the same effect as providing the guard band. In addition, in the case of dividing the wavelength band into three or more, the shortest wavelength of the second wavelength band onward except the shortest wavelength band is rendered uninserted in advance. FIG. 6 shows a waveform chart of the first example.

Figure 14:
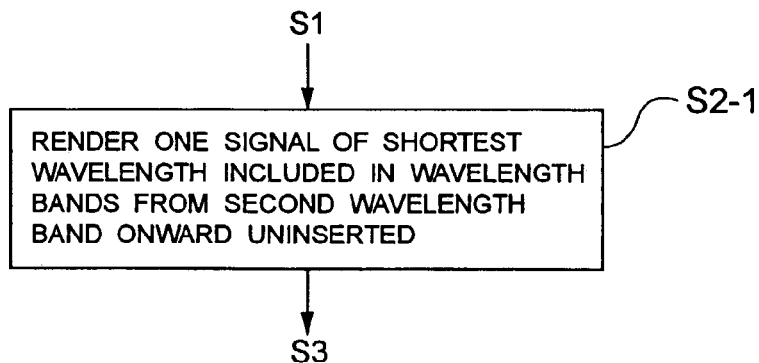
FIG. 14 is a flowchart showing a part of operation of the second example.

Next, a second example will be described. The second example is a flow chart of the multiplexing method used for the transmission apparatus shown in the first example. FIG. 14 is a flowchart showing a part of the operation of the second example. FIG. 14 has S2 in FIG. 12 replaced by S2-1. The other steps are the same as FIGS. 12 and 13.

With reference to FIG. 14, after dividing the wavelength band into a plurality (S1), the shortest wavelength of the second wavelength band onward is rendered uninserted (S2-1). Next, the odd-numbered array waves and even-numbered array waves are orthogonal-polarization-multiplexed in each of the wavelength bands (S3). Hereafter, it is the same as FIGS. 12 and 13.

Figure 7:
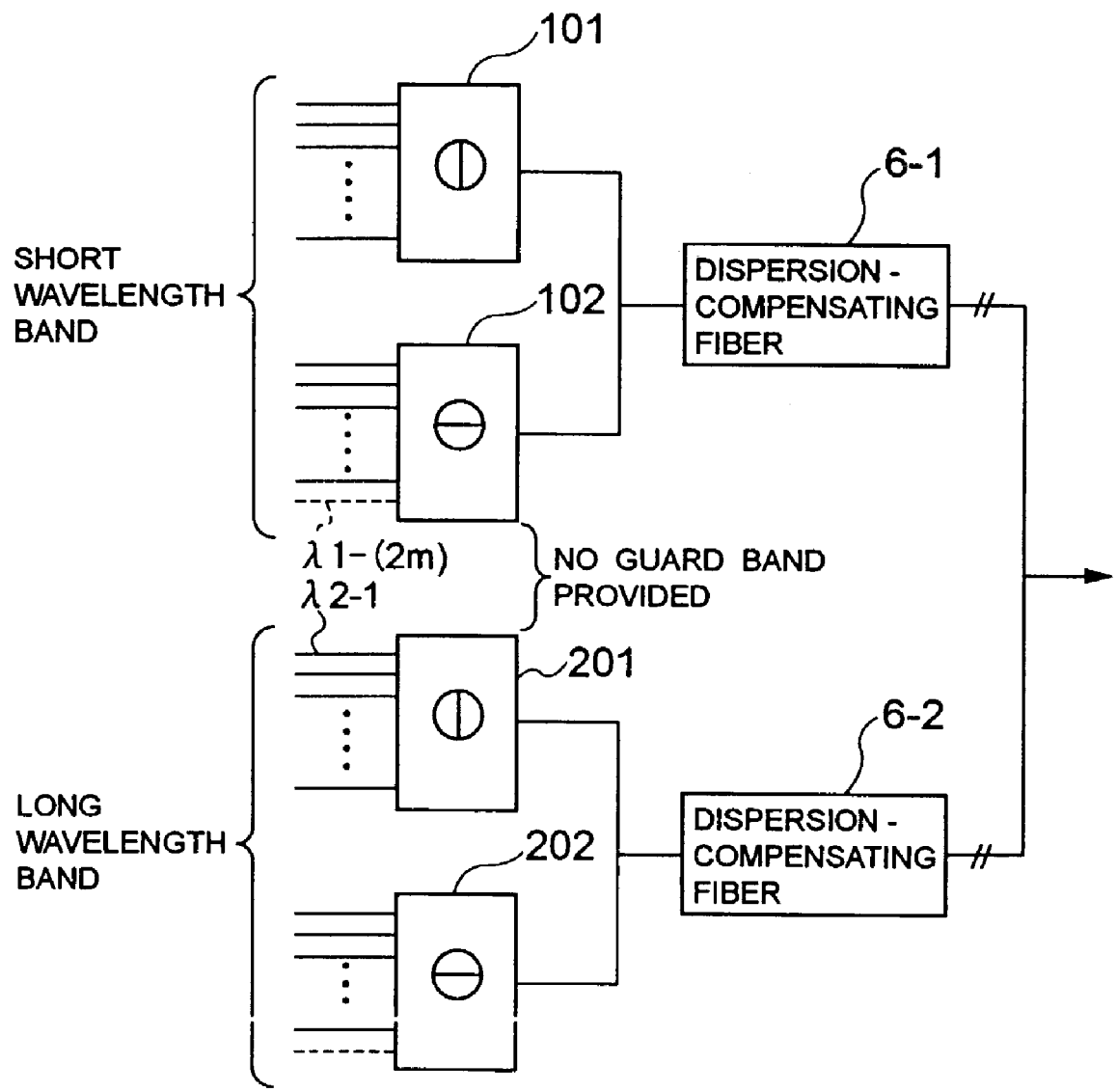
FIG. 7 is a block diagram of a third example.

Next, a third example will be described. FIG. 7 is a block diagram of the third example. Moreover, while only the odd-number array polarization multiplexing portions 101, 201, the even-number array polarization multiplexing portions 102, 202 and the dispersion-compensating fibers 6-1, 6-2 are shown for the sake of convenience in this diagram, the basic configuration is the same as that of the first embodiment (refer to FIG. 1).

Figure 8:
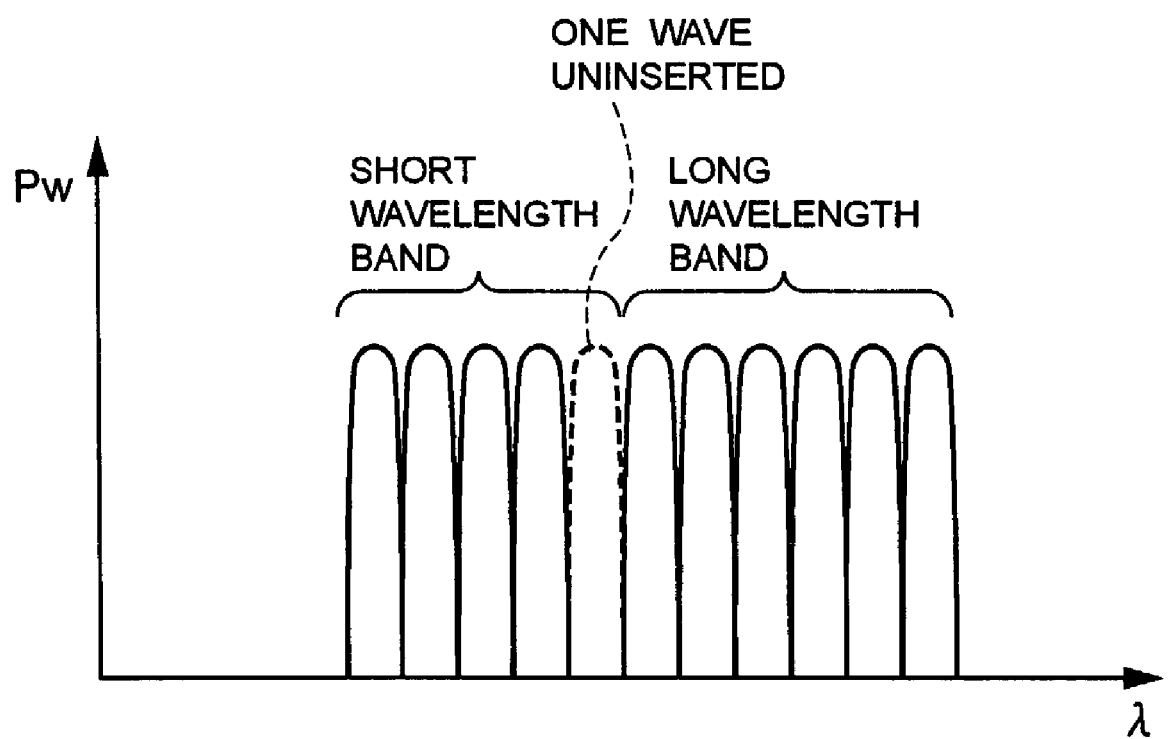
FIG. 8 is a waveform chart of the third example.

With reference to FIG. 7, the guard band shown in the first embodiment is not provided in the third example, either. Instead, in the case of dividing it into two, that is, the short wavelength band and the long wavelength band, the longest wavelength $\lambda1$-(2m) of the short wavelength band is rendered uninserted in advance. It thus has the same effect as providing the guard band. In addition, in the case of dividing the wavelength band into three or more, the longest wavelength of each wavelength band is rendered uninserted in advance. FIG. 8 shows a waveform chart of the third example.

Figure 15:
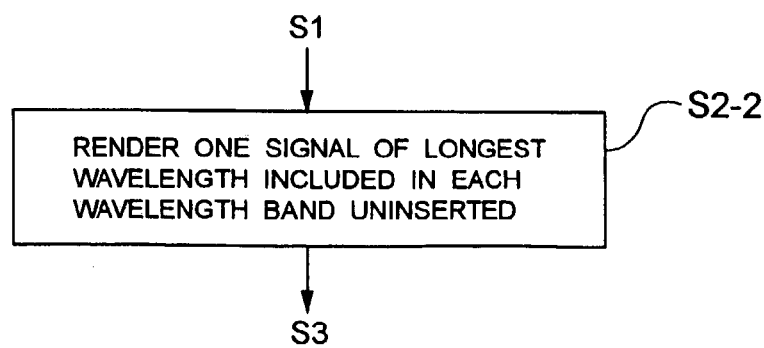
FIG. 15 is a flowchart showing a part of the operation of a fourth example.

Next, a fourth example will be described. The fourth example is a flow chart of the multiplexing method used for the transmission apparatus shown in the third example. FIG. 15 is a flowchart showing a part of the operation of the fourth example. FIG. 15 has S2 in FIG. 12 replaced by S2-2. The other steps are the same as FIGS. 12 and 13.

With reference to FIG. 15, after dividing the wavelength band into a plurality (S1), the longest wavelength of each wavelength band is rendered uninserted (S2-2). Next, the odd-numbered array waves and even-numbered array waves are orthogonal-polarization-multiplexed in each of the wavelength bands (S3). Hereafter, it is the same as FIGS. 12 and 13.

Figure 9:
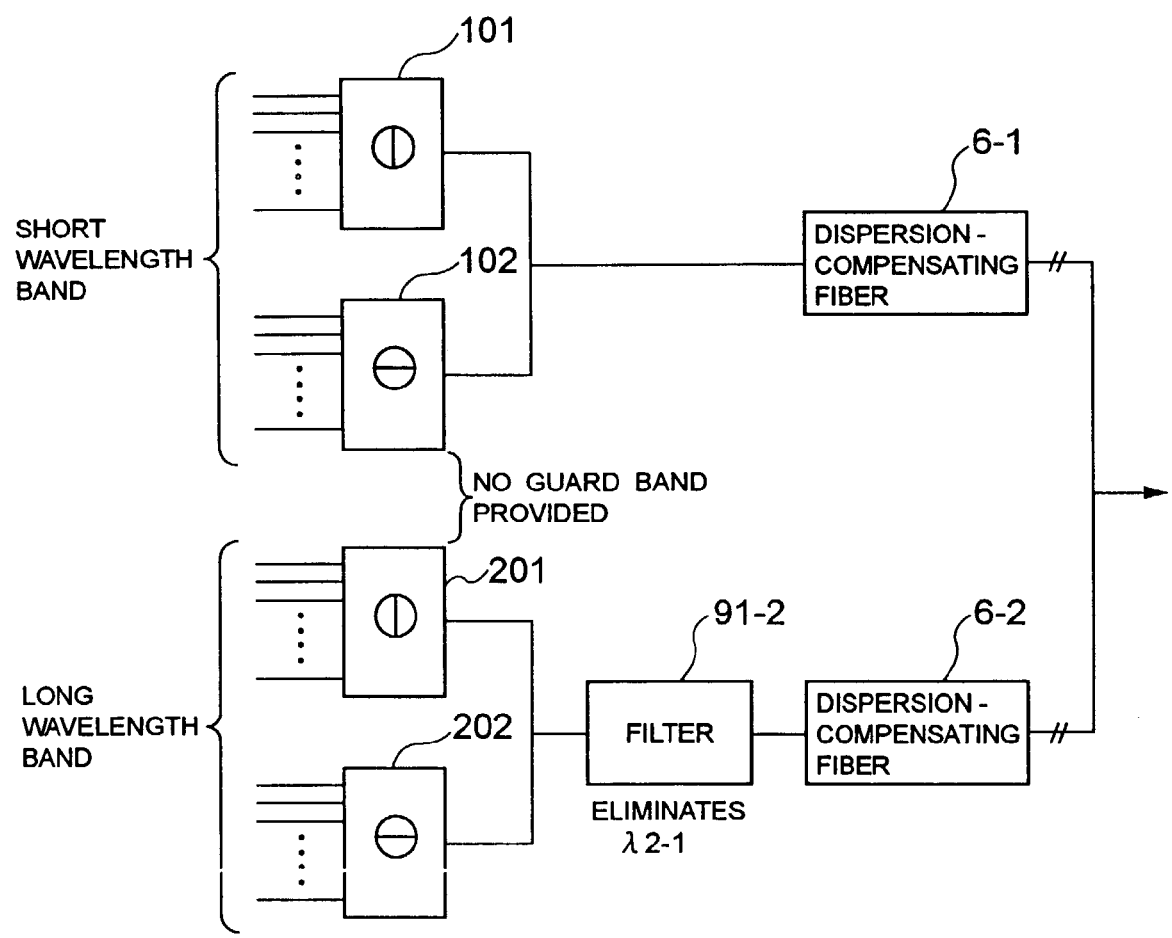
FIG. 9 is a block diagram of a fifth example.

Next, a fifth example will be described. FIG. 9 is a block diagram of the fifth example. Moreover, while the odd-number array polarization multiplexing portions 101, 201, the even-number array polarization multiplexing portions 102, 202, the dispersion-compensating fibers 6-1, 6-2 and a notch filter 91 are shown in this diagram, the basic configuration is the same as that of the first embodiment (refer to FIG. 1) except that the notch filter 91 is added.

With reference to FIG. 9, the guard band shown in the first embodiment is not provided in the fifth example, either. Instead, in the case of dividing it into two, that is, the short wavelength band and the long wavelength band, a notch filter 91-2 for eliminating the shortest wavelength $\lambda2$-1 of the long wavelength band is inserted between the polarization orthogonal multiplexer 4-2 (not shown) and the dispersion-compensating fiber 6-2 in the long wavelength band. It thus has the same effect as providing the guard band. In addition, in the case of dividing the wavelength band into three or more, notch filters 92-2, 93-2, . . . are inserted into each of the wavelength bands from the second wavelength band onward except the shortest wavelength band. The waveform chart of the fifth example is the same as FIG. 6.

Figure 16:
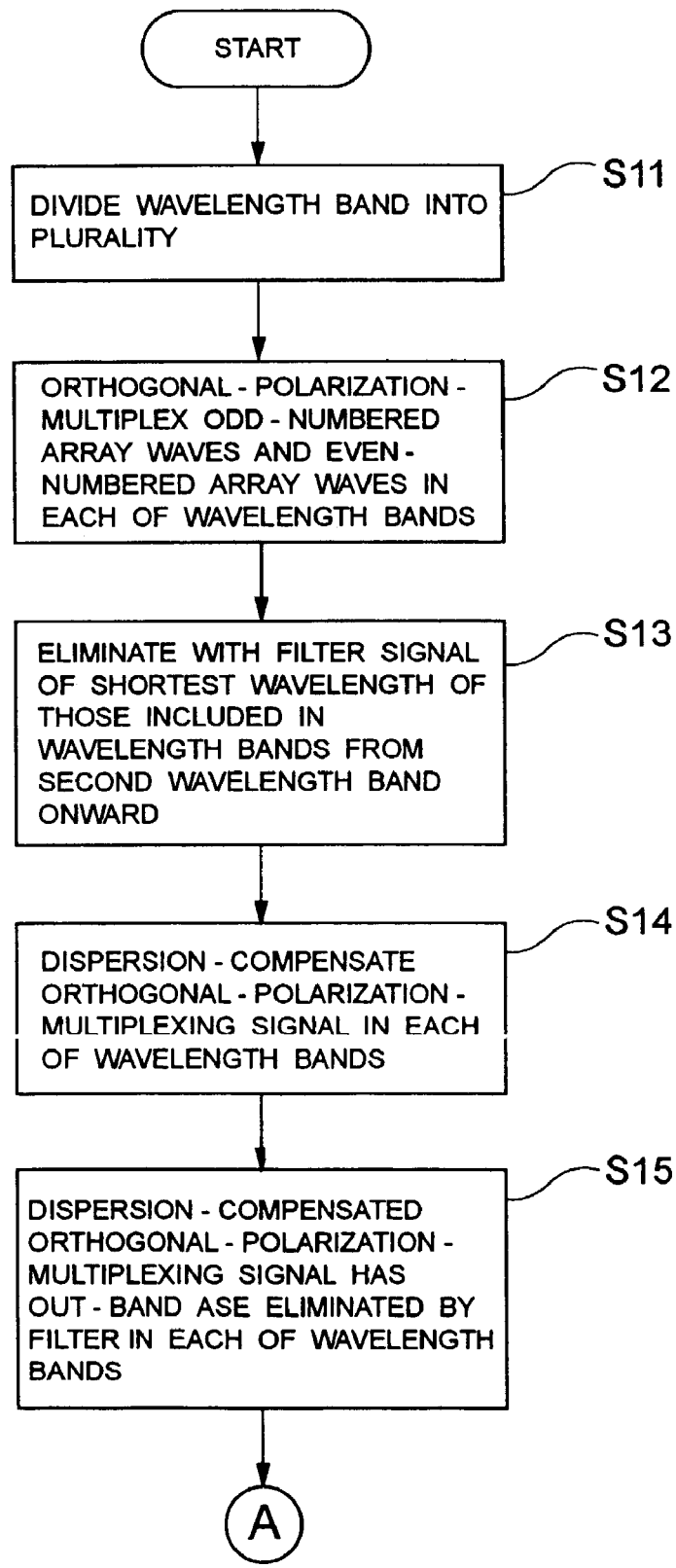
FIG. 16 is a flowchart showing the operation of a sixth example.

Next, a sixth example will be described. The sixth example is a flow chart of the multiplexing method used for the transmission apparatus shown in the fifth example. FIG. 16 is a flowchart showing the operation of the sixth example.

With reference to FIG. 16, the wavelength band is divided into a plurality (two in the fifth example) first (S11), and next, the odd-numbered array waves and even-numbered array waves are orthogonal-polarization-multiplexed in each of wavelength bands (S12). Next, of the signals included in the wavelength bands from the second wavelength band onward, the signal of the shortest wavelength $\lambda2$-1 is eliminated by the notch filter 91-2 (S13), and furthermore, the orthogonal polarization multiplexing signal is dispersion-compensated in each of the wavelength bands (S14). Next, the dispersion-compensated orthogonal polarization multiplexing signal has the out-band ASE eliminated by the band pass filter in each of the wavelength bands (S15), and thereafter, the steps S6 and S7 in FIG. 13 are performed.

Figure 10:
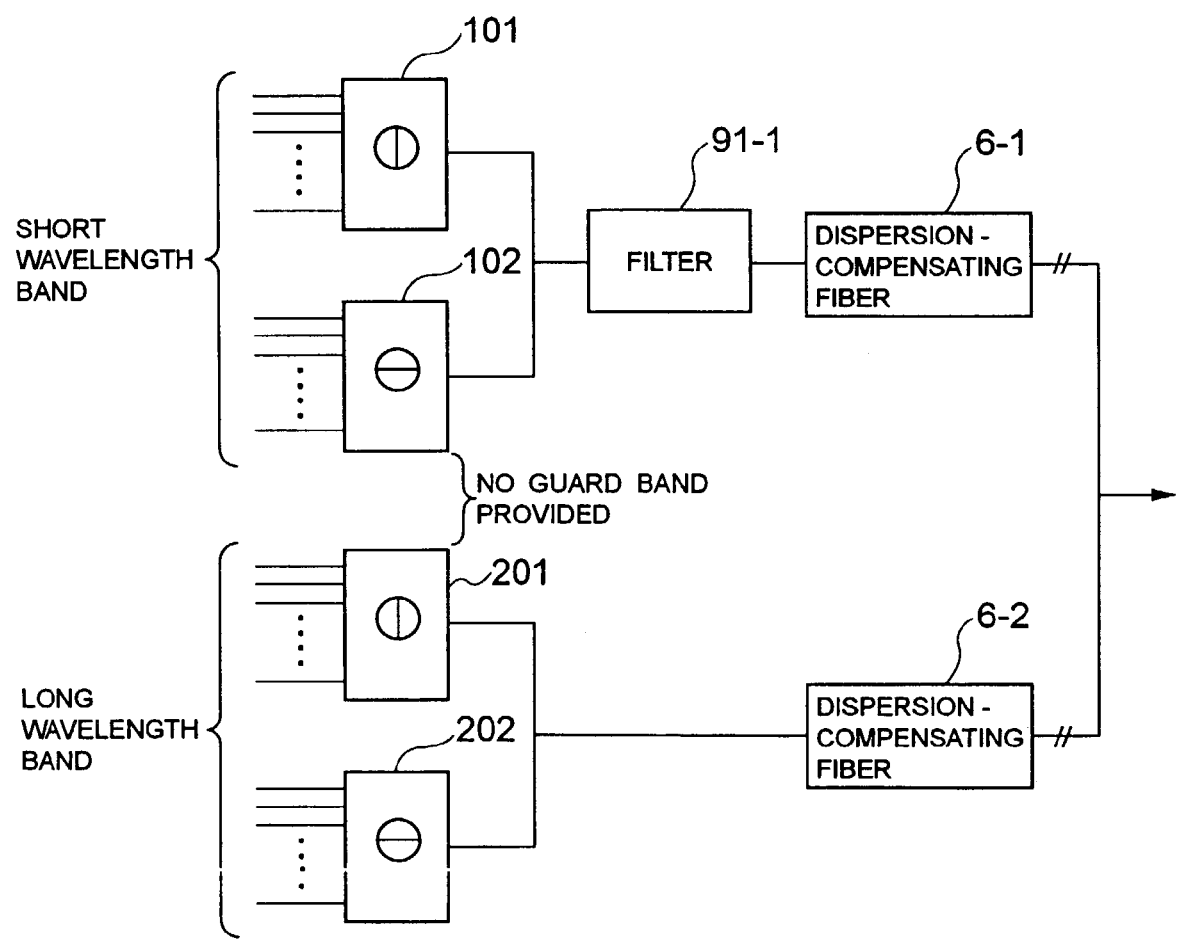
FIG. 10 is a block diagram of a seventh example.

Next, a seventh example will be described. FIG. 10 is a block diagram of the seventh example. Moreover, while the odd-number array polarization multiplexing portions 101, 201, the even-number array polarization multiplexing portions 102, 202, the dispersion-compensating fibers 6-1, 6-2 and a notch filter 91-1 are shown in this diagram, the basic configuration is the same as that of the first embodiment (refer to FIG. 1) except that the notch filter 91-1 is added.

With reference to FIG. 10, the guard band shown in the first embodiment is not provided in the seventh example, either. Instead, in the case of dividing it into two, that is, the short wavelength band and the long wavelength band, a notch filter 91-1 for eliminating the longest wavelength $\lambda1$-(2m) of the short wavelength band is inserted between the polarization orthogonal multiplexer 4-1 (not shown) and the dispersion-compensating fiber 6-1 in the short wavelength band. It thus has the same effect as providing the guard band. In addition, in the case of dividing the wavelength band into three or more, notch filters 92-1 and 93-1 are inserted into each of the wavelength bands except the longest wavelength band. The waveform chart of the seventh example is the same as FIG. 8.

Figure 17:
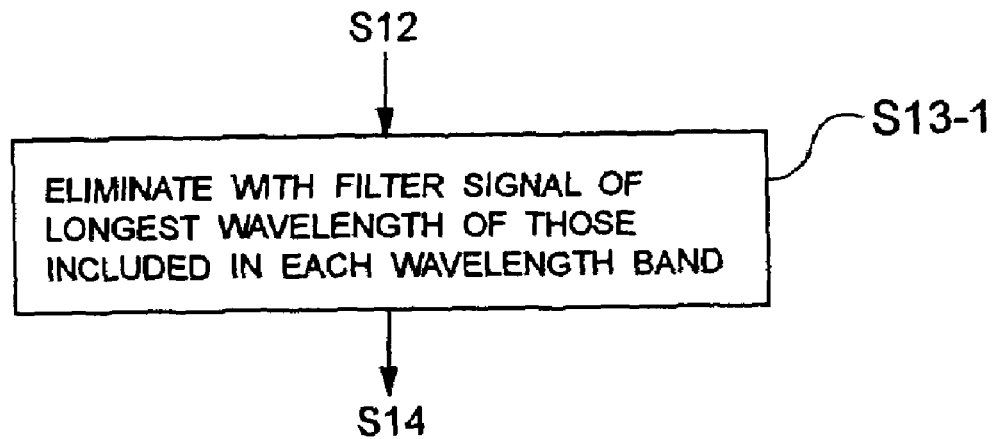
FIG. 17 is a flowchart showing a part of the operation of an eighth example.
Figure 18:
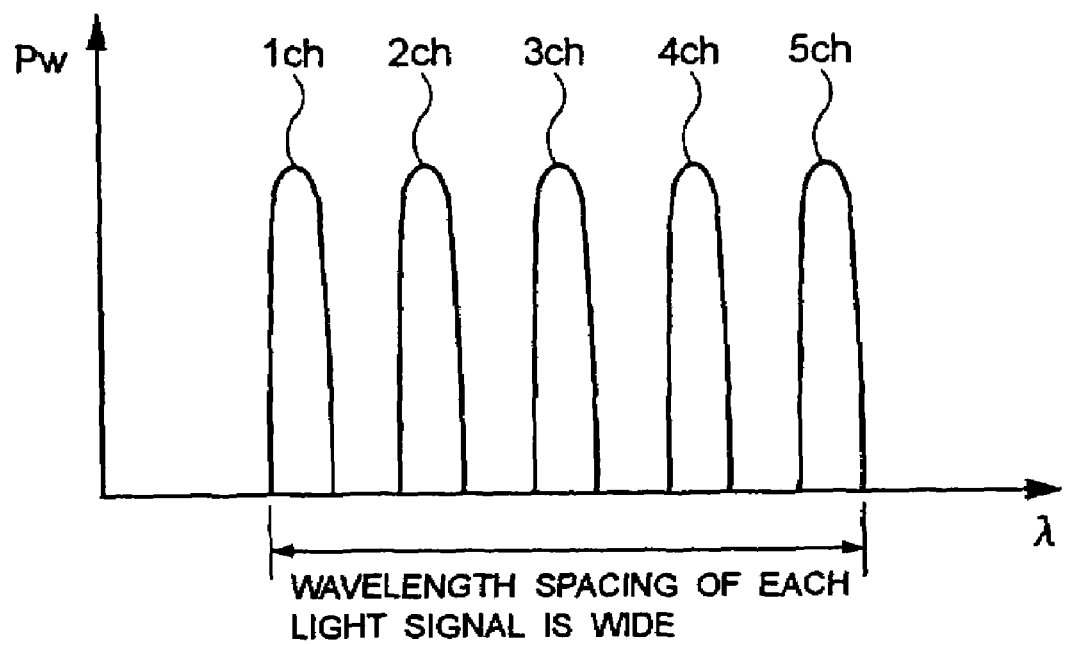
FIG. 18 is a waveform chart of an example of wavelength division multiplexing in the past.
Figure 19:
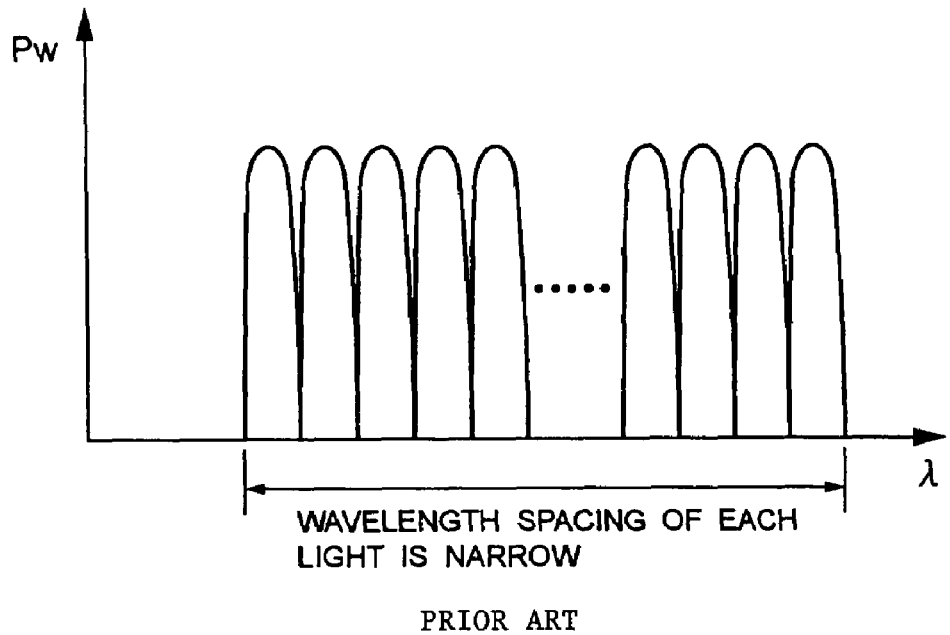
FIG. 19 is a waveform chart of an example of dense wavelength division multiplexing.
Figure 20:
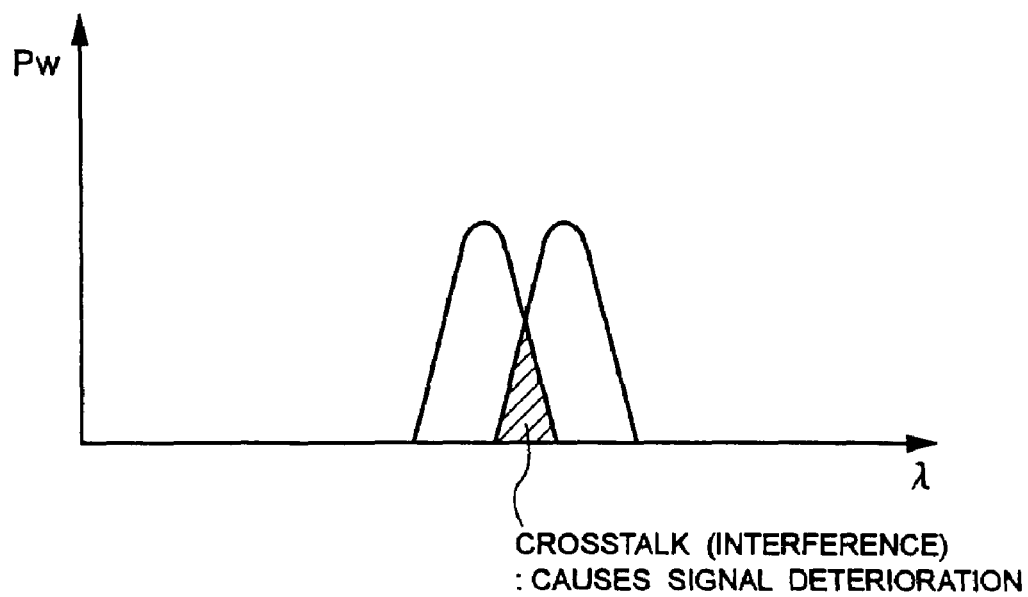
FIG. 20 is an explanatory diagram of crosstalk.
Figure 21:
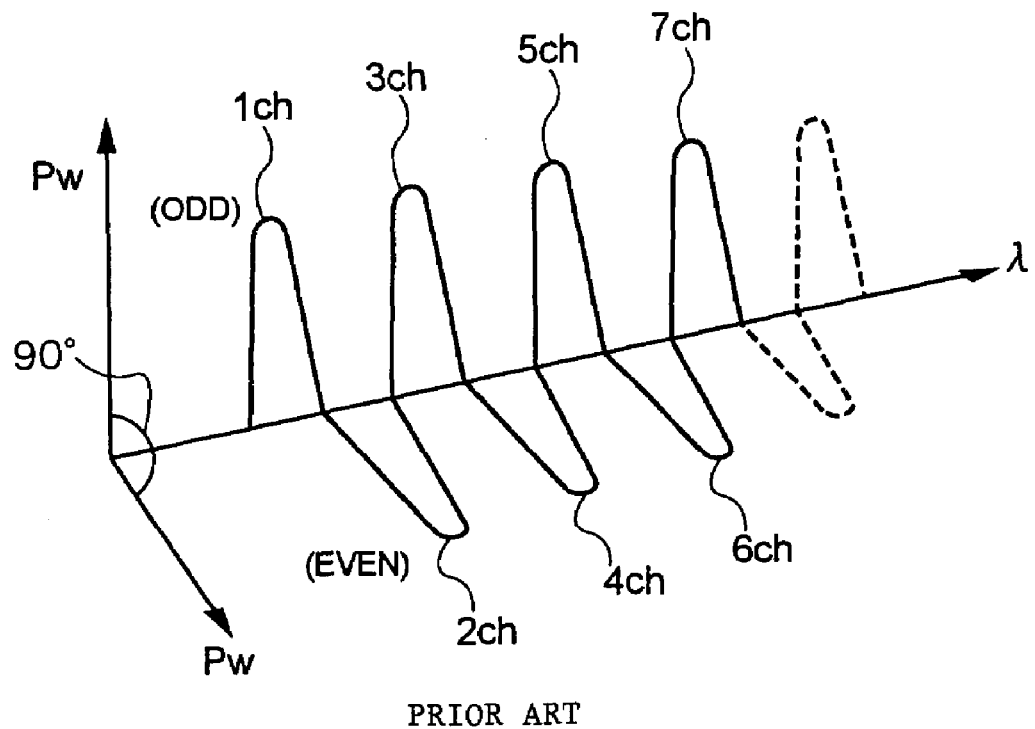
FIG. 21 is a waveform chart showing an example of orthogonal polarization multiplexing.
Figure 22:
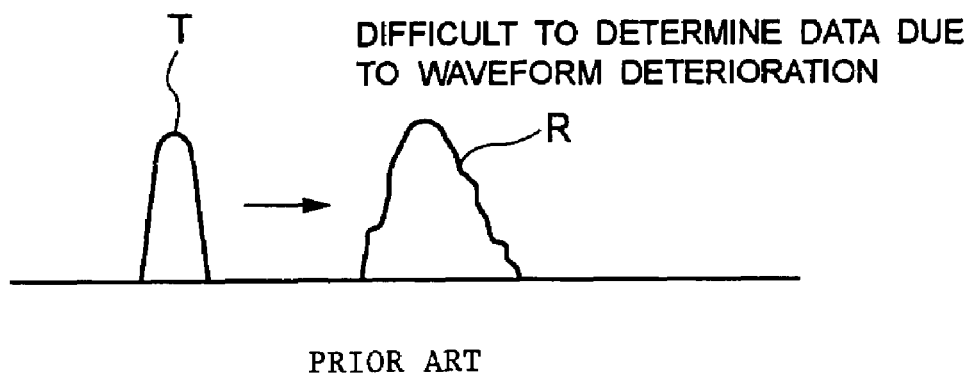
FIG. 22 is an explanatory diagram of the signal deterioration due to the wavelength dispersion.

Next, an eighth example will be described. The eighth example is a flowchart of the multiplexing method used for the transmission apparatus shown in the seventh example. FIG. 17 is a flowchart showing a part of the operation of the eighth example. FIG. 17 has S13 in FIG. 16 replaced by S13-1. The other steps are the same as FIGS. 16 and 13.

With reference to FIGS. 16 and 17, the wavelength band is divided into a plurality (two in the seventh example) first (S11), and next, the odd-numbered array waves and even-numbered array waves are orthogonal-polarization-multiplexed in each of wavelength bands (S12). Next, of the signals included in each wavelength band, the signal of the longest wavelength $\lambda 1\text{-}(2m)$ is eliminated by the notch filter 91-1 (S13-1), and furthermore, the orthogonal polarization multiplexing signal is dispersion-compensated in each of the wavelength bands (S14). Next, the dispersion-compensated orthogonal polarization multiplexing signal has the out-band ASE eliminated by the band pass filter in each of the wavelength bands (S15), and thereafter, the steps S6 and S7 in FIG. 13 are performed.

Figure 11:
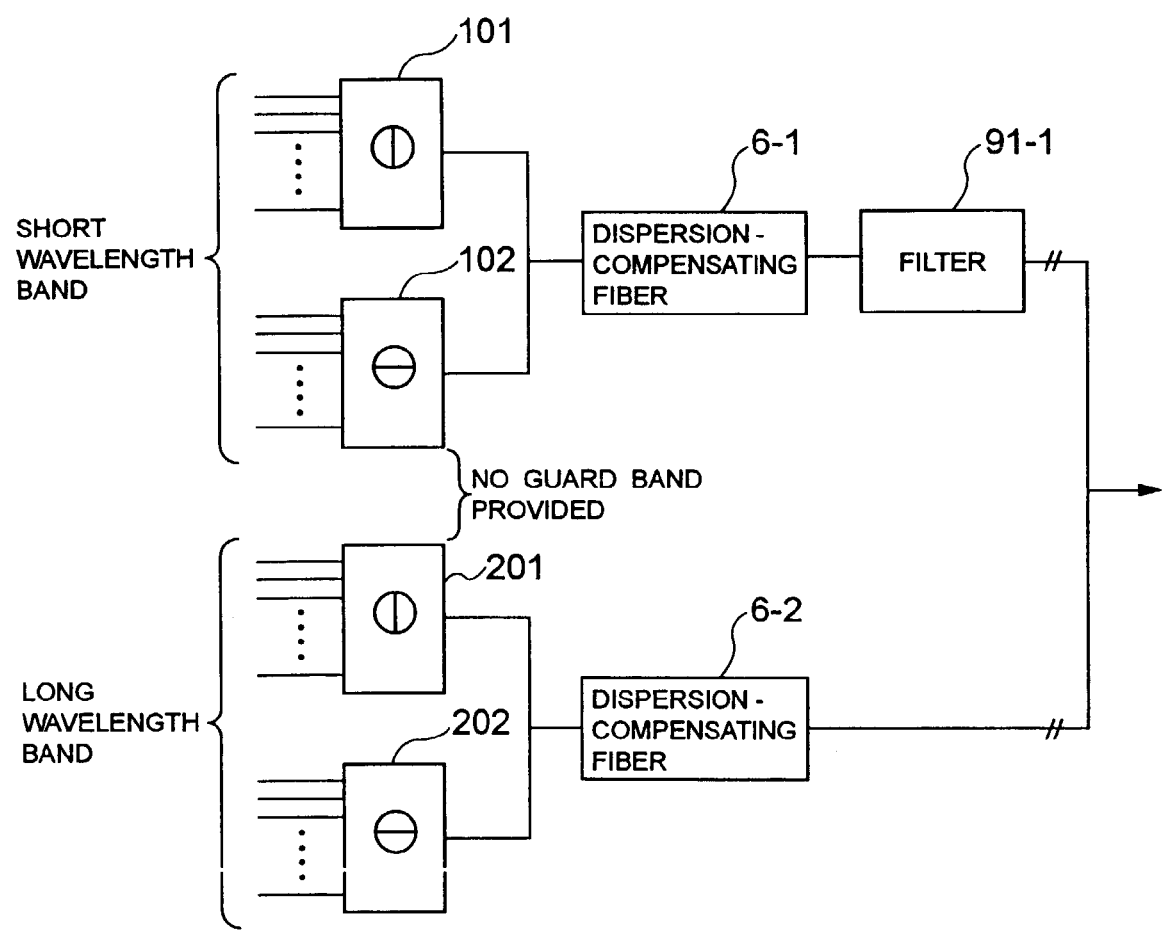
FIG. 11 is a block diagram of a ninth example.

Lastly, a ninth example will be described. FIG. 11 is a block diagram of the ninth example. The ninth example (FIG. 11) is different from the seventh example (FIG. 10) in that the ninth example has the notch filter 91-1 provided in the subsequent stage of the dispersion-compensating fiber 6-1. This configuration has the same effect as the seventh example. Moreover, in the case where the notch filter is provided in the wavelength band from the second wavelength band onward as in the fifth example (FIG. 9), it is also possible to provide it in the subsequent stage of the dispersion-compensating fiber.

The orthogonal polarization multiplexing transmission apparatus according to the present invention is the apparatus in wavelength division multiplexing characterized by including a plurality of orthogonal polarization multiplexing means for orthogonal-polarization-multiplexing the odd numbered array waves and even-numbered array waves in each of the wavelength bands divided into a plurality, a plurality of dispersion compensating means for dispersion-compensating the signal orthogonal-polarization-multiplexed by each orthogonal polarization multiplexing means, and multiplexing means for multiplexing each signal dispersion-compensated by each dispersion compensating means, and wherein the band rendered wider than the wavelength spacing on the orthogonal polarization multiplexing is provided between the wavelength bands divided into a plurality, and so it is possible to perform the dispersion compensation considering the short wavelength side and the long wavelength side of the zero dispersion wavelength In addition, the multiplexing method according to the present invention is the method used for the orthogonal polarization multiplexing transmission apparatus in the wavelength division multiplexing, characterized by including a plurality of orthogonal polarization multiplexing steps of orthogonal-polarization-multiplexing the odd-numbered array waves and even-numbered array waves in each of the wavelength bands divided into a plurality, a plurality of dispersion compensating steps of dispersion-compensating the signal orthogonal-polarization-multiplexed in each orthogonal polarization multiplexing step, and a multiplexing step of multiplexing each signal dispersion-compensated in each dispersion compensating step, and further including a step of providing the band rendered wider than the wavelength spacing on the orthogonal polarization multiplexing between the above described wavelength bands divided into a plurality, and so it has the same effects as the above-mentioned orthogonal polarization multiplexing transmission apparatus.

To describe it concretely, the present invention has the following effects.

(1) As it has the configuration wherein no dispersion-compensating fiber is provided in a polarization preserving route, the configuration can be easily implemented only with a general dispersion-compensating fiber which has been conventionally used, and in addition, the dispersion-compensating fiber is shared by a plurality of wavelengths so that the configuration can be implemented without placing a burden as to costs and an implementation floor.

(2) As it has the configuration allowing transmission dispersion compensation management to be conducted as to each of the divided wavelength bands, it is possible to further segmentalize and optimize the transmission dispersion compensation management and further extend the transmission distance than the past method of performing collective dispersion compensation to all the wavelengths.

What is claimed is:

1. An orthogonal polarization multiplexing transmission apparatus in wavelength division multiplexing, comprising:
   a plurality of orthogonal polarization multiplexing means for orthogonal-polarization-multiplexing odd-numbered array waves and even-numbered array waves in each of wavelength bands divided into a plurality;
   a plurality of dispersion compensating means for dispersion-compensating a signal orthogonal-polarization-multiplexed by each orthogonal polarization multiplexing means; and
   multiplexing means for multiplexing each signal dispersion-compensated by each dispersion compensating means,
   wherein a band rendered wider than a wavelength spacing on orthogonal polarization multiplexing is provided between said wavelength bands divided into a plurality, and
   wherein, in two adjacent wavelength bands, either a signal of the longest wavelength of a short wavelength band or a signal of the shortest wavelength of a long wavelength band is uninserted.

2. An orthogonal polarization multiplexing transmission apparatus in wavelength division multiplexing, comprising:
   a plurality of orthogonal polarization multiplexing means for orthogonal-polarization-multiplexing odd-numbered array waves and even-numbered array waves in each of wavelength bands divided into a plurality;
   a plurality of dispersion compensating means for dispersion-compensating a signal orthogonal-polarization-multiplexed by each orthogonal polarization multiplexing means; and
   multiplexing means for multiplexing each signal dispersion-compensated by each dispersion compensating means,
   wherein a band rendered wider than a wavelength spacing on orthogonal polarization multiplexing is provided between said wavelength bands divided into a plurality, and
   wherein, in two adjacent wavelength bands, a filter for eliminating either a signal of the longest wavelength of a short wavelength band or a signal of the shortest wavelength of a long wavelength band is eliminated.

3. The orthogonal polarization multiplexing transmission apparatus according to claim 2, wherein said filter for eliminating either the signal of the longest wavelength of the short wavelength band or the signal of the shortest wavelength of the long wavelength band is provided between said orthogonal polarization multiplexing means and dispersion compensating means.

4. The orthogonal polarization multiplexing transmission apparatus according to claim 2, wherein said filter for eliminating either the signal of the longest wavelength of the short wavelength band or the signal of the shortest wavelength of the long wavelength band is provided between said dispersion compensating means and multiplexing means.

5. An orthogonal polarization multiplexing method used for an orthogonal polarization multiplexing transmission apparatus in wavelength division multiplexing, comprising:
   a plurality of orthogonal polarization multiplexing steps of orthogonal-polarization-multiplexing odd-numbered array waves and even-numbered array waves in each of wavelength bands divided into a plurality;
   a plurality of dispersion compensating steps of dispersion-compensating a signal orthogonal-polarization-multiplexed in each orthogonal polarization multiplexing step;
   a multiplexing step of multiplexing each signal dispersion-compensated in each dispersion compensating step; and
   a step of providing a band rendered wider than a wavelength spacing on orthogonal polarization multiplexing between said wavelength bands divided into a plurality,
   wherein, a step of rendering either a signal of the longest wavelength of a short wavelength band or a signal of the shortest wavelength of a long wavelength band uninserted in two adjacent wavelength bands is included.

6. An orthogonal polarization multiplexing method used for an orthogonal polarization multiplexing transmission apparatus in wavelength division multiplexing, comprising:
   a plurality of orthogonal polarization multiplexing steps of orthogonal-polarization-multiplexing odd-numbered array waves and even-numbered array waves in each of wavelength bands divided into a plurality;
   a plurality of dispersion compensating steps of dispersion-compensating a signal orthogonal-polarization-multiplexed in each orthogonal polarization multiplexing step;
   a multiplexing step of multiplexing each signal dispersion-compensated in each dispersion compensating step; and
   a step of providing a band rendered wider than a wavelength spacing on orthogonal polarization multiplexing between said wavelength bands divided into a plurality,
   wherein a step of eliminating either a signal of the longest wavelength of a short wavelength band or a signal of the shortest wavelength of a long wavelength band in two adjacent wavelength bands is included.

7. The orthogonal polarization multiplexing method according to claim 6, wherein said step of eliminating either the signal of the longest wavelength of the short wavelength band or the signal of the shortest wavelength of the long wavelength band is provided between said orthogonal polarization multiplexing step and dispersion compensating step.

8. An orthogonal polarization multiplexing transmission apparatus in wavelength division multiplexing comprising:
   a plurality of orthogonal polarization multiplexing portions for orthogonal-polarization-multiplexing odd-numbered array waves and even-numbered array waves in each of wavelength bands divided into a plurality;
   a plurality of dispersion-compensating fibers for dispersion-compensating a signal orthogonal-polarization-multiplexed by each orthogonal polarization multiplexing portion; and
   a multiplexer for multiplexing each signal dispersion-compensated by each dispersion-compensating fiber,
   wherein a band rendered wider than a wavelength spacing on orthogonal polarization multiplexing is provided between said wavelength bands divided into a plurality,
   wherein, in two adjacent wavelength bands, either a signal of the longest wavelength of a short wavelength band or a signal of the shortest wavelength of a long wavelength band is uninserted.

9. An orthogonal polarization multiplexing transmission apparatus in wavelength division multiplexing comprising:
   a plurality of orthogonal polarization multiplexing portions for orthogonal-polarization-multiplexing odd-numbered array waves and even-numbered array waves in each of wavelength bands divided into a plurality;
   a plurality of dispersion-compensating fibers for dispersion-compensating a signal orthogonal-polarization-multiplexed by each orthogonal polarization multiplexing portion; and
   a multiplexer for multiplexing each signal dispersion-compensated by each dispersion-compensating fiber,
   wherein a band rendered wider than a wavelength spacing on orthogonal polarization multiplexing is provided between said wavelength bands divided into a plurality,
   wherein, in two adjacent wavelength bands, a filter for eliminating either a signal of the longest wavelength of a short wavelength band or a signal of the shortest wavelength of a long wavelength band is included.

10. The orthogonal polarization multiplexing transmission apparatus according to claim 9, wherein said filter for eliminating either the signal of the longest wavelength of the short wavelength band or the signal of the shortest wavelength of the long wavelength band is provided between said orthogonal polarization multiplexing portion and dispersion-compensating fiber.

11. The orthogonal polarization multiplexing transmission apparatus according to claim 9, wherein said filter for eliminating either the signal of the longest wavelength of the short wavelength band or the signal of the shortest wavelength of the long wavelength band is provided between said dispersion-compensating fiber and multiplexer.

* * * * *